US006952287B2

(12) United States Patent
Aoki

(10) Patent No.: US 6,952,287 B2
(45) Date of Patent: Oct. 4, 2005

(54) ELECTRO-OPTICAL APPARATUS, IMAGE PROCESSING CIRCUIT, IMAGE DATA CORRECTION METHOD, AND ELECTRONIC APPARATUS

(75) Inventor: Toru Aoki, Shojiri (JP)

(73) Assignee: Seiko Epson Corporation, Tokyo (JP)

( * ) Notice: Subject to any disclaimer, the term of this patent is extended or adjusted under 35 U.S.C. 154(b) by 933 days.

(21) Appl. No.: 09/764,436

(22) Filed: Jan. 19, 2001

(65) Prior Publication Data

US 2001/0015835 A1 Aug. 23, 2001

(30) Foreign Application Priority Data

Jan. 28, 2000 (JP) ....................................... 2000-020817
Mar. 27, 2000 (JP) ....................................... 2000-087147
Oct. 4, 2000 (JP) ....................................... 2000-304983

(51) Int. Cl.[7] ................................................ G06K 15/00

(52) U.S. Cl. ........................ 358/1.9; 358/520; 382/274; 345/426

(58) Field of Search ................................ 358/509, 520, 358/475, 1.9, 2.1; 382/274; 345/426, 207

(56) References Cited

U.S. PATENT DOCUMENTS 4,779,144 A * 10/1988 Dischert et al. .............. 386/31
5,125,042 A * 6/1992 Kerr et al. .................. 382/300
5,229,868 A * 7/1993 Kanno et al. ............... 358/462
5,754,240 A * 5/1998 Wilson .................. 375/240.15
6,067,124 A * 5/2000 Shirahama et al. ......... 348/581
6,298,155 B1 * 10/2001 Mitsunaga et al. ......... 382/190

FOREIGN PATENT DOCUMENTS

JP A-3-18822 1/1991
JP A-5-64110 3/1993

* cited by examiner

*Primary Examiner*—Jerome Grant, II
(74) *Attorney, Agent, or Firm*—Oliff & Berridge, PLC

(57) ABSTRACT

An interpolation processor interpolates reference correction data stored in a ROM according to the level (gray scale) to generate correction data DHr which correspond to gray scales available for image data, for each of a plurality of reference coordinates. The correction data DHr are stored in a correction table. From the correction data DHr stored in the correction table, an address generator specifies storage locations at which correction data DHr1 to DHr4 are stored, which correspond to four reference coordinates surrounding the coordinates, based on X-coordinate data, Y-coordinate data, and the image data. An arithmetic unit interpolates the correction data DHr1 to DHr4, which are read from the correction table, according to the coordinates and generates correction data Dh. An adder adds the correction data Dh to the image data to generate corrected image data. It is thus possible to remove nonuniformity of luminance and nonuniformity of color in a display screen.

14 Claims, 16 Drawing Sheets

[FIG. 1]
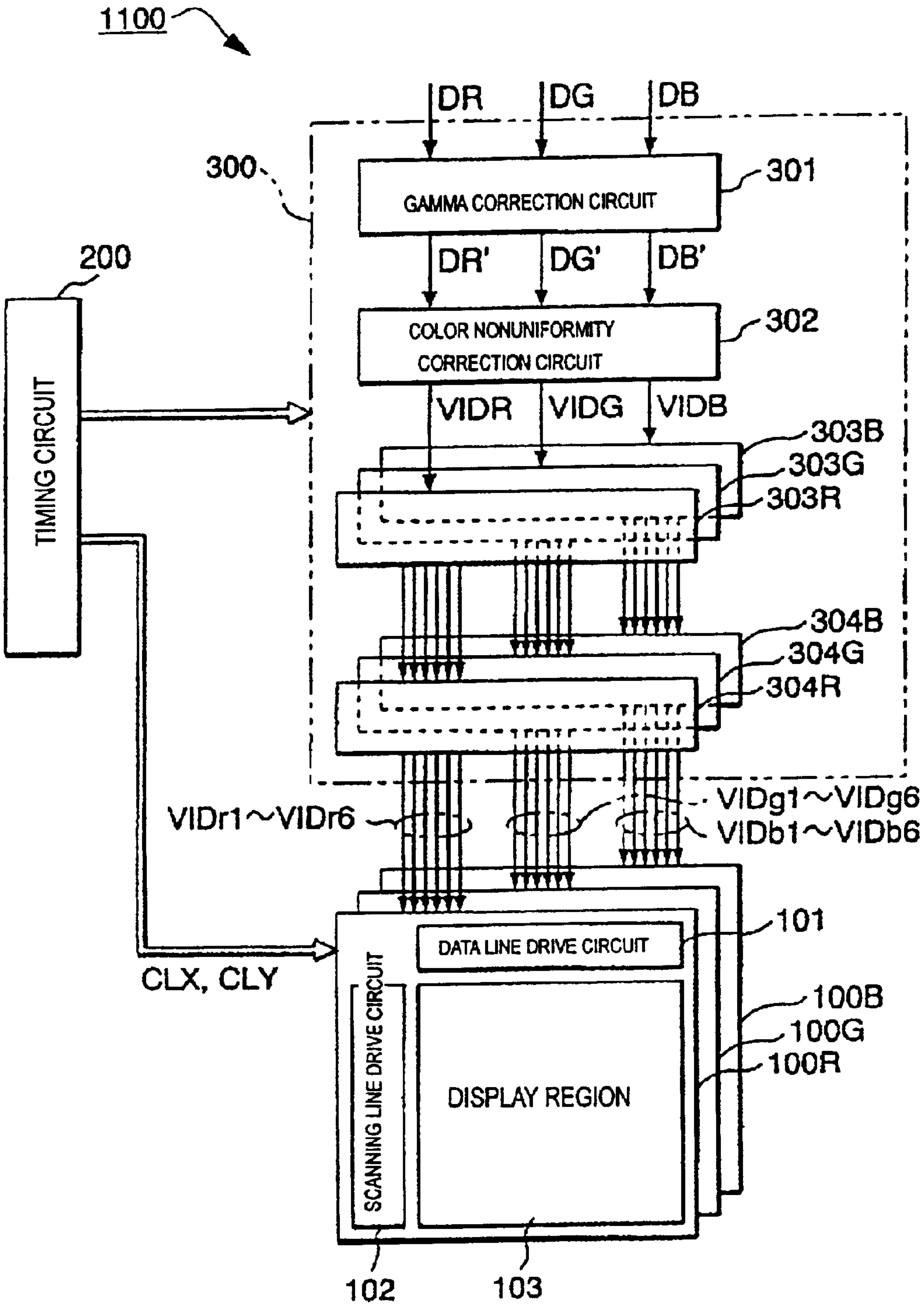

[FIG. 2]
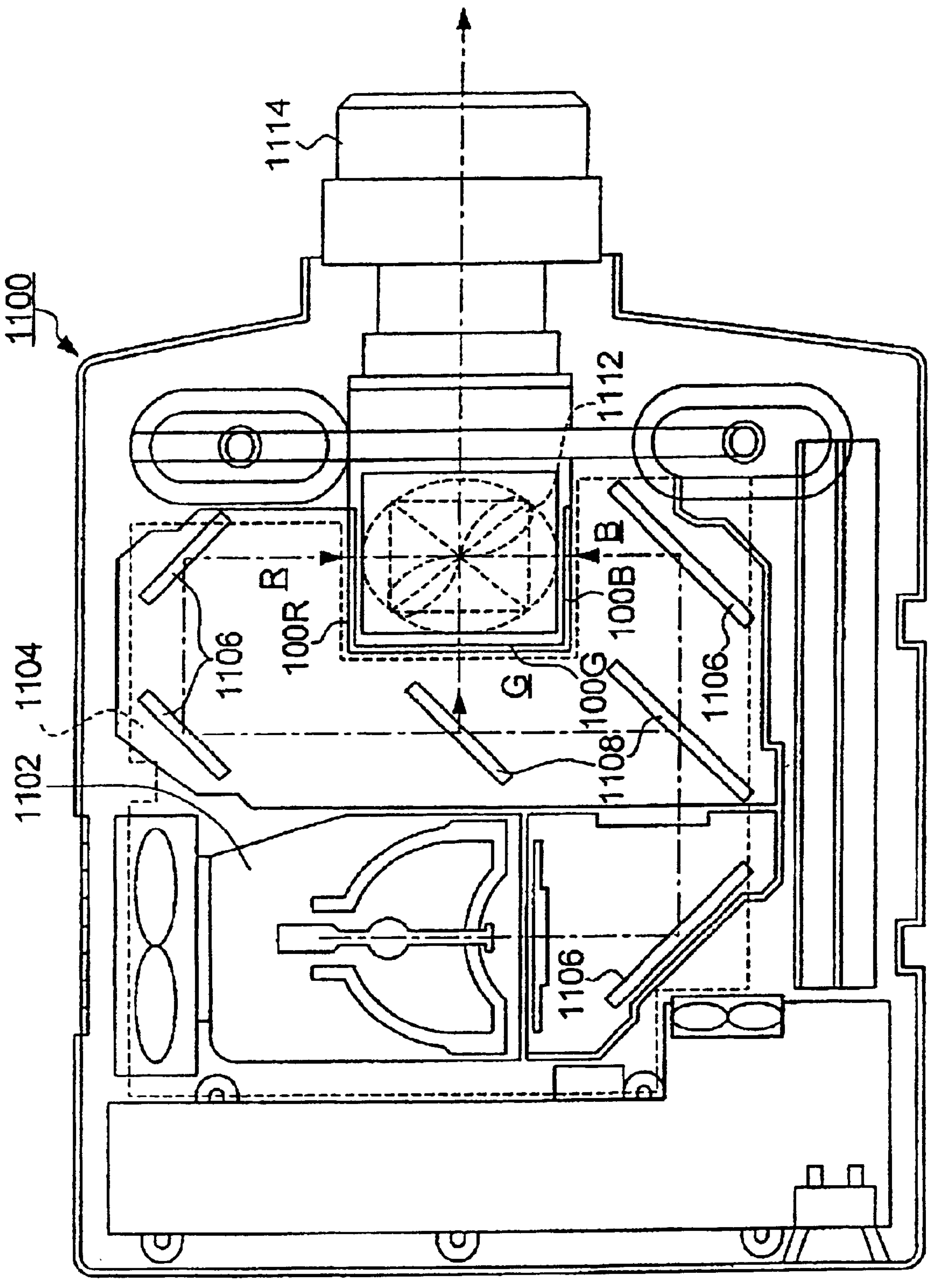

[FIG. 3]
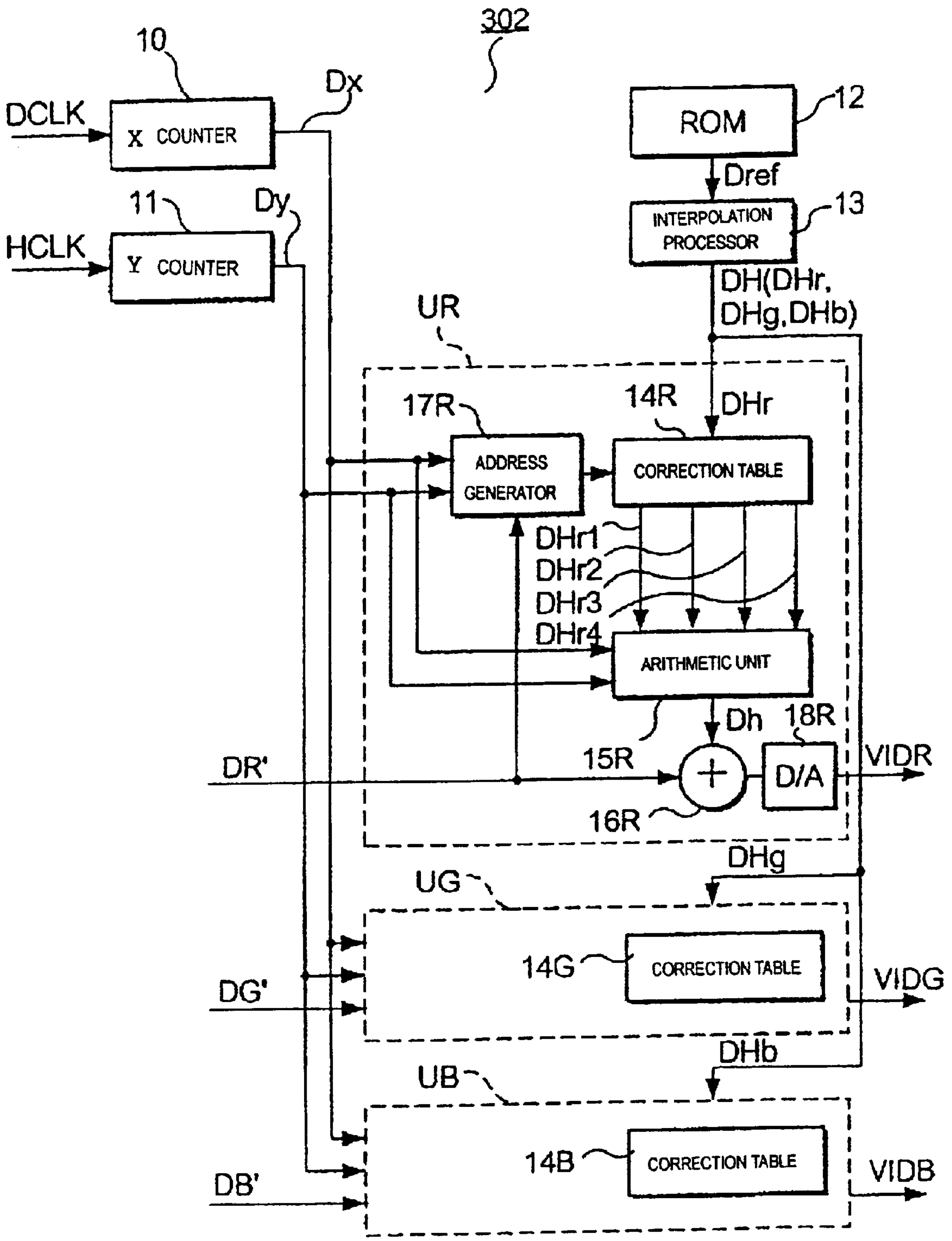

[FIG. 4]
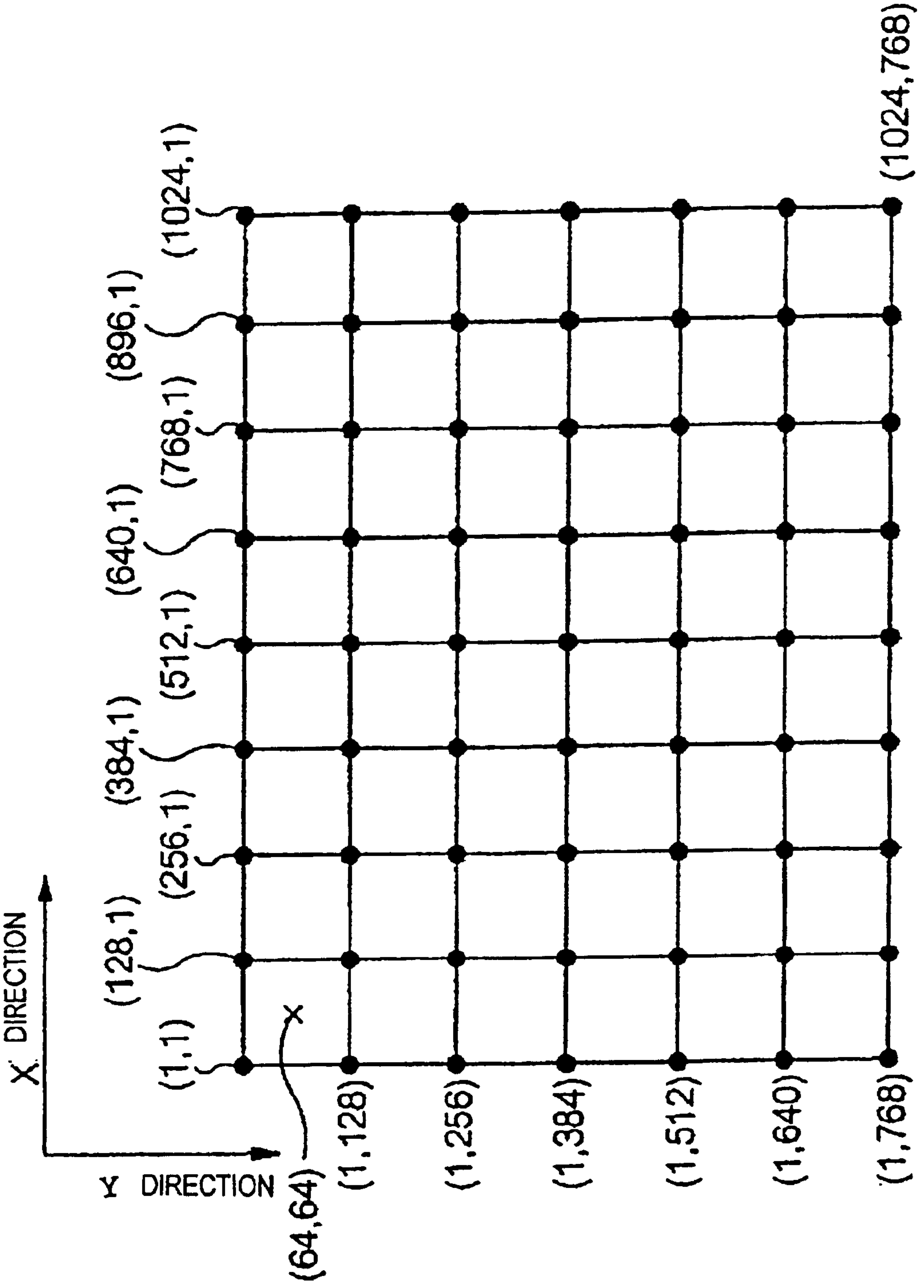

[FIG. 5]
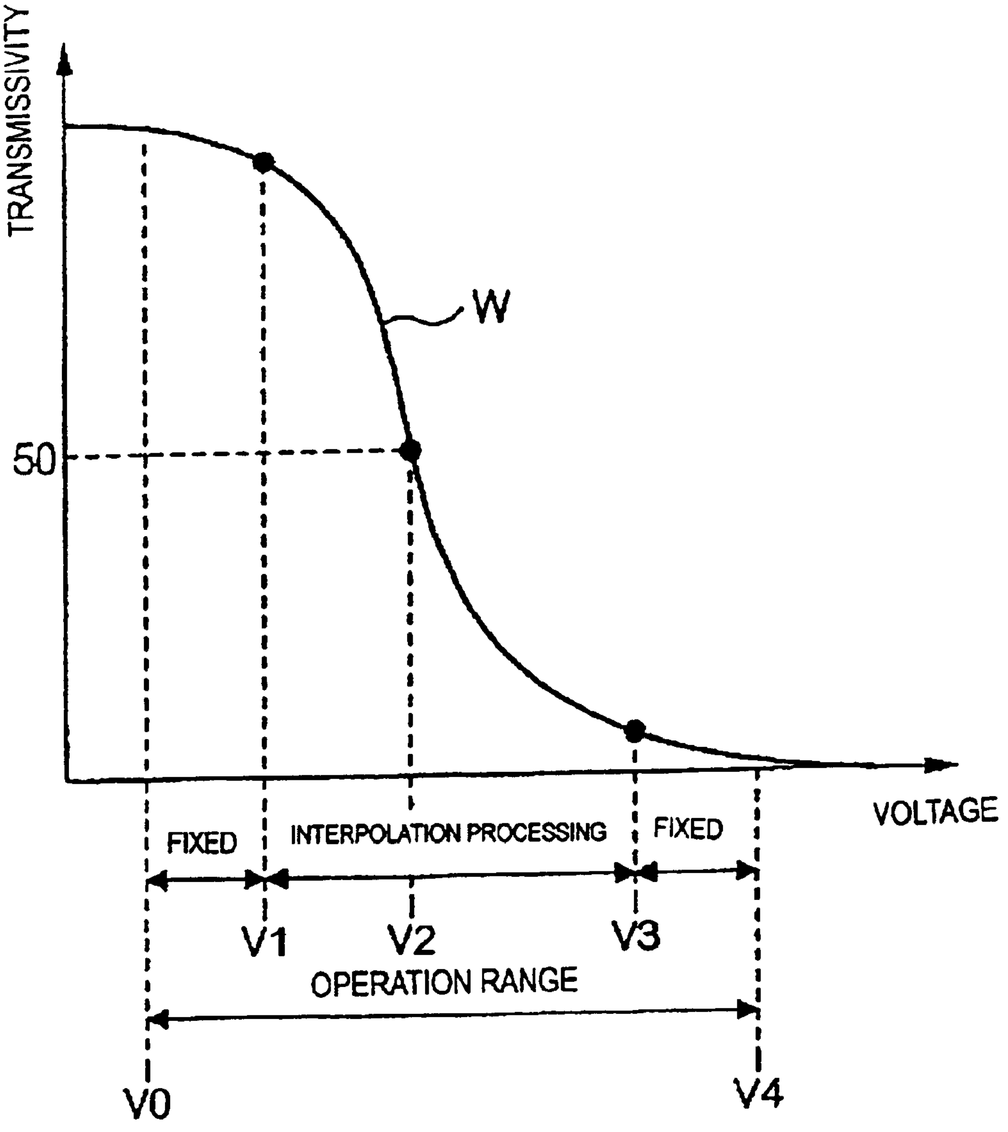

[FIG. 6]

12

| (X,Y) | R:Drefr | | | G:Drefg | | | B:Drefb | | |
|---|---|---|---|---|---|---|---|---|---|
| (1,1) | DRw1,1 | DRc1,1 | DRb1,1 | DGw1,1 | DGc1,1 | DGb1,1 | DBw1,1 | DBc1,1 | DBb1,1 |
| (128,1) | DRw128,1 | DRc128,1 | DRb128,1 | DGw128,1 | DGc128,1 | DGb128,1 | DBw128,1 | DBc128,1 | DBb128,1 |
| (256,1) | DRw256,1 | DRc256,1 | DRb256,1 | DGw256,1 | DGc256,1 | DGb256,1 | DBw256,1 | DBc256,1 | DBb256,1 |
| ⋮ | ⋮ | ⋮ | ⋮ | ⋮ | ⋮ | ⋮ | ⋮ | ⋮ | ⋮ |
| (i,j) | DRwi,j | DRci,j | DRbi,j | DGwi,j | DGci,j | DGbi,j | DBwi,j | DBci,j | DBbi,j |
| ⋮ | ⋮ | ⋮ | ⋮ | ⋮ | ⋮ | ⋮ | ⋮ | ⋮ | ⋮ |
| (1024,768) | DRw1024, 768 | DRc1024, 768 | DRb1024, 768 | DGw1024, 768 | DGc1024, 768 | DGb1024, 768 | DBw1024, 768 | DBc1024, 768 | DBb1024, 768 |

63 ITEMS

[FIG. 7]
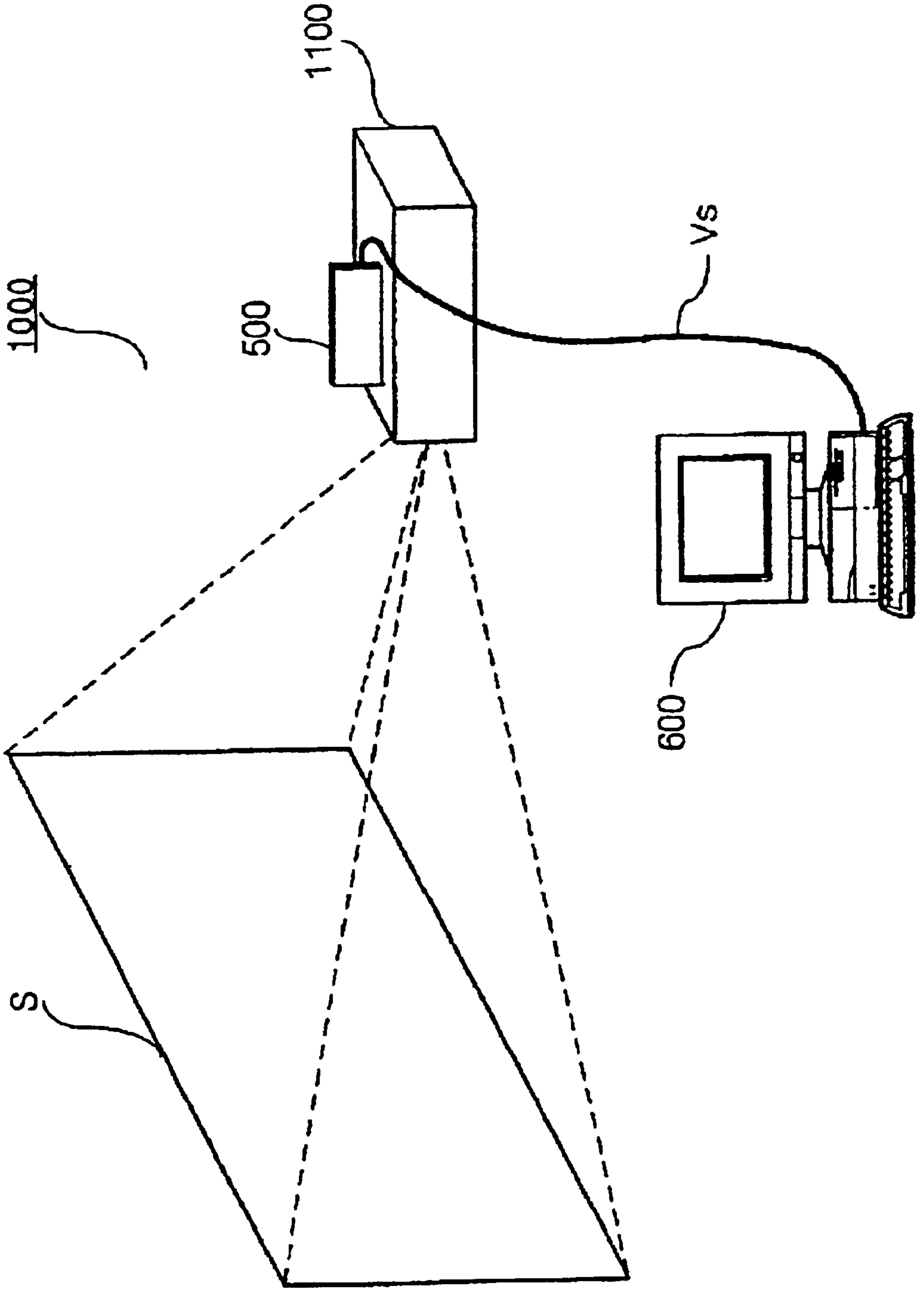

[FIG. 8]

14R

| | | 1st COLUMN | 2nd COLUMN | 3rd COLUMN | ... | (n-1)th COLUMN | nth COLUMN |
|---|---|---|---|---|---|---|---|
| | (X,Y) | m | m+1 | m+2 | ... | n-1 | n |
| 1st ROW | (1,1) | DHr1, 1(m) | DHr1, 1(m+1) | DHr1, 1(m+2) | ... | DHr1, 1(n-1) | DHr1, 1(n) |
| 2nd ROW | (128,1) | DHr128, 1(m) | DHr128, 1(m+1) | DHr128, 1(m+2) | ... | DHr128, 1(n-1) | DHr128, 1(n) |
| ... | ... | ... | ... | ... | ... | ... | ... |
| 10th ROW | (1,128) | DHr1, 128(m) | DHr1, 128(m+1) | DHr1, 128(m+2) | ... | DHr1, 128(n-1) | DHr1, 128(n) |
| 11th ROW | (128,128) | DHr128, 128(m) | DHr128, 128(m+1) | DHr128, 128(m+2) | ... | DHr128, 128(n-1) | DHr128, 128(n) |
| ... | ... | ... | ... | ... | ... | ... | ... |
| 63rd ROW | (1024,768) | DHr1024, 768(m) | DHr1024, 768(m+1) | DHr1024, 768(m+2) | ... | DHr1024, 768(n-1) | DHr1024, 768(n) |

[FIG.9]
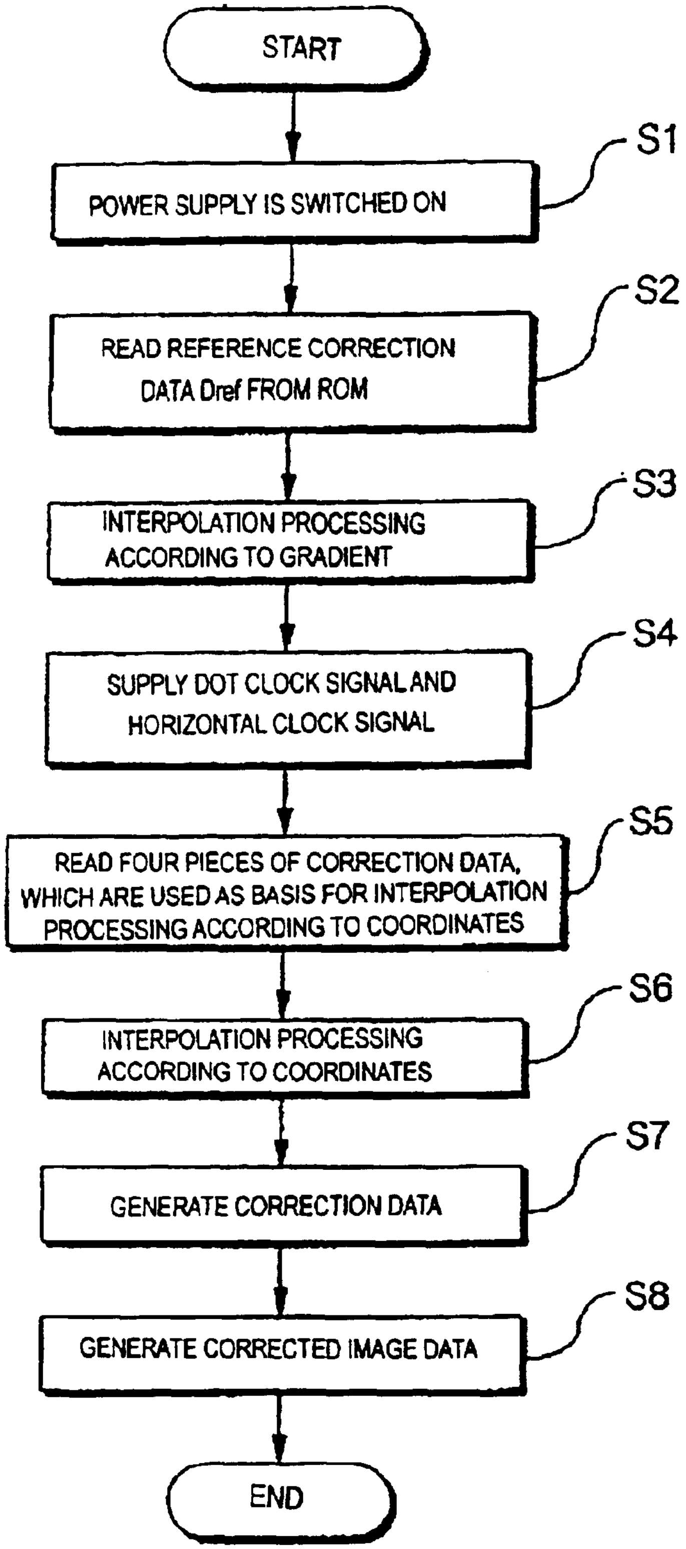

[FIG. 10]
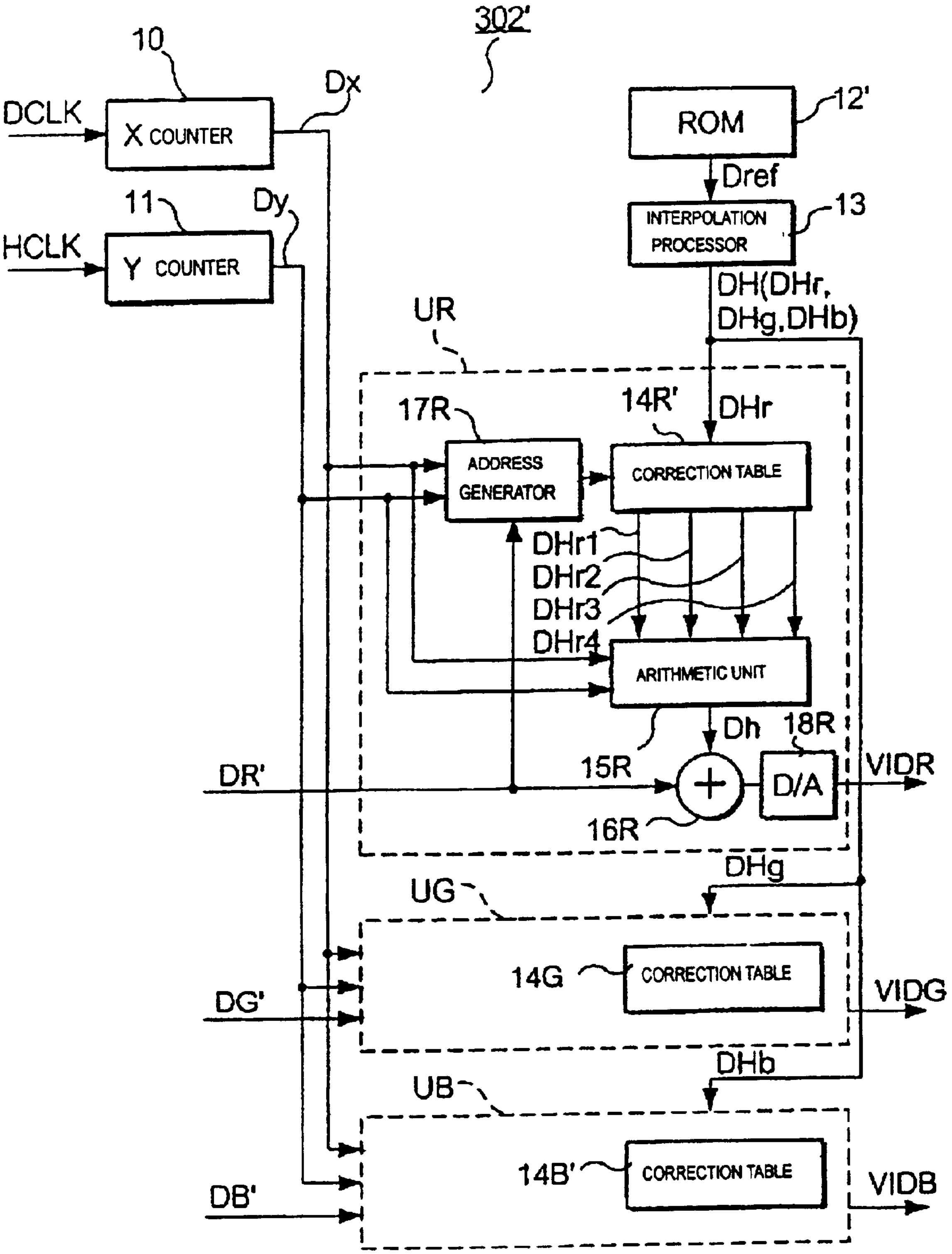

[FIG. 11]
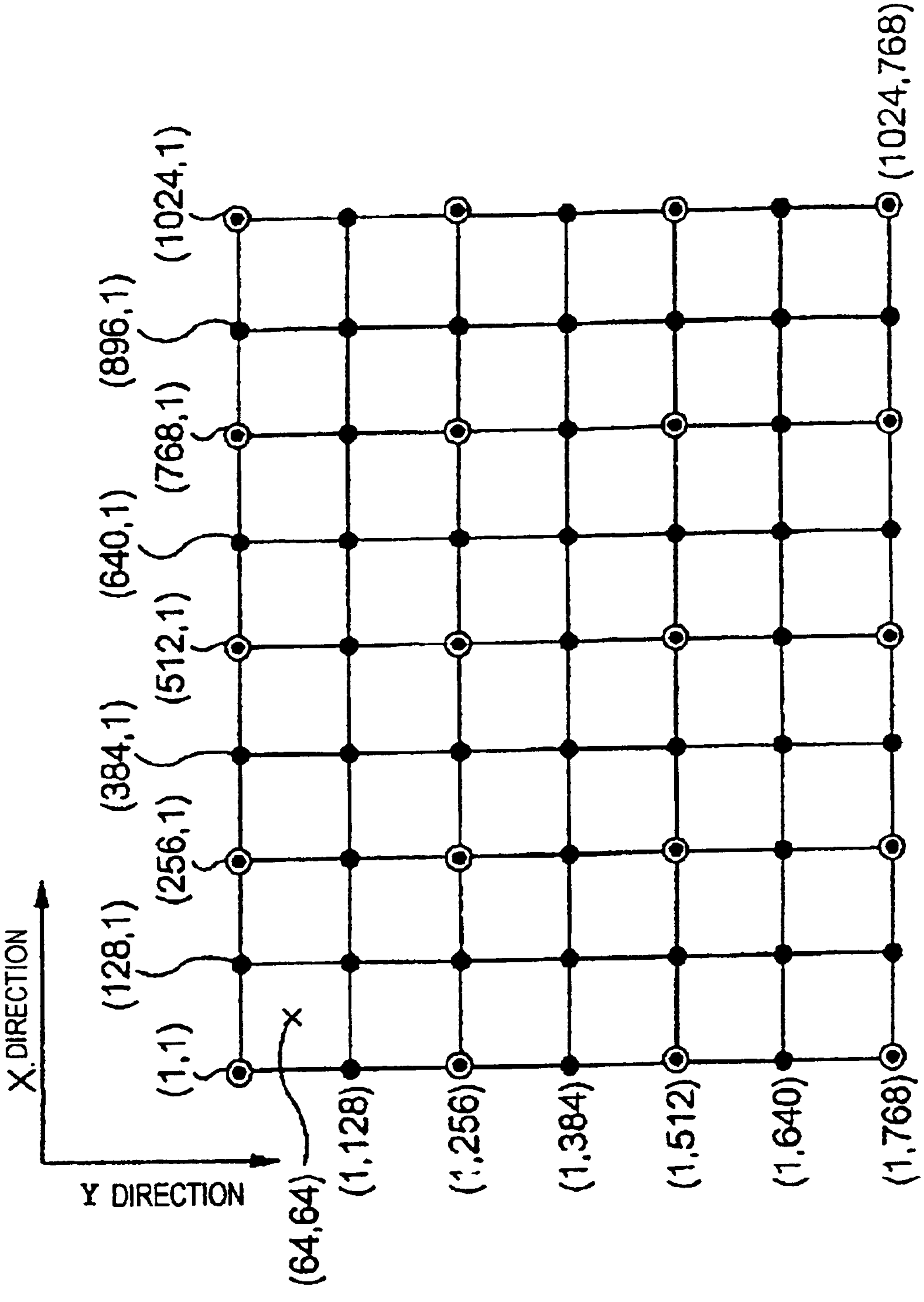

[FIG. 12]

12'

| (X,Y) | R:Drefr | | | G:Drefg | | | B:Drefb | | |
|---|---|---|---|---|---|---|---|---|---|
| (1,1) | DRw1,1 | DRc1,1 | DRb1,1 | DGw1,1 | DGc1,1 | DGb1,1 | DBw1,1 | DBc1,1 | DBb1,1 |
| (128,1) | - | - | - | DGw128,1 | DGc128,1 | DGb128,1 | - | - | - |
| (256,1) | DRw256,1 | DRc256,1 | DRb256,1 | DGw256,1 | DGc256,1 | DGb256,1 | DBw256,1 | DBc256,1 | DBb256,1 |
| ⋮ | ⋮ | ⋮ | ⋮ | ⋮ | ⋮ | ⋮ | ⋮ | ⋮ | ⋮ |
| (1,128) | - | - | - | DGw1,128 | DGc1,128 | DGb1,128 | - | - | - |
| (128,128) | - | - | - | DGw 128,128 | DGc 128,128 | DGb 128,128 | - | - | - |
| (256,128) | - | - | - | DGw 256,128 | DGc 256,128 | DGb 256,128 | - | - | - |
| ⋮ | ⋮ | ⋮ | ⋮ | ⋮ | ⋮ | ⋮ | ⋮ | ⋮ | ⋮ |
| (1024,128) | - | - | - | DGw 1024,128 | DGc 1024,128 | DGb 1024,128 | - | - | - |
| ⋮ | ⋮ | ⋮ | ⋮ | ⋮ | ⋮ | ⋮ | ⋮ | ⋮ | ⋮ |
| (1024,768) | DRw1024, 768 | DRc1024, 768 | DRb1024, 768 | DGw1024, 768 | DGc1024, 768 | DGb1024, 768 | DBw1024, 768 | DBc1024, 768 | DBb1024, 768 |

63 ITEMS

[FIG. 13]

14R'

| | | 1st COLUMN | 2nd COLUMN | 3rd COLUMN | • • • | (n-1)th COLUMN | nth COLUMN |
|---|---|---|---|---|---|---|---|
| | (X,Y) | m | m+1 | m+2 | • • • | n-1 | n |
| 1st ROW | (1,1) | DHr1, 1(m) | DHr1, 1(m+1) | DHr1, 1(m+2) | • • • | DHr1, 1(n-1) | DHr1, 1(n) |
| 2nd ROW | (256,1) | DHr256, 1(m) | DHr256, 1(m+1) | DHr256, 1(m+2) | • • • | DHr256, 1(n-1) | DHr256, 1(n) |
| ⋮ | ⋮ | ⋮ | ⋮ | ⋮ | ⋮ | ⋮ | ⋮ |
| 5th ROW | (1024,1) | DHr1024, 1(m) | DHr1024, (m+1) | DHr1024, (m+2) | • • • | DHr1024, (n-1) | DHr1024, (n) |
| 6th ROW | (1,256) | DHr1, 256(m) | DHr1, 256(m+1) | DHr1, 256(m+2) | • • • | DHr1, 256(n-1) | DHr1, 256(n) |
| ⋮ | ⋮ | ⋮ | ⋮ | ⋮ | ⋮ | ⋮ | ⋮ |
| 20th ROW | (1024,768) | DHr1024, 768(m) | DHr1024, 768(m+1) | DHr1024, 768(m+2) | • • • | DHr1024, 768(n-1) | DHr1024, 768(n) |

[FIG. 14]
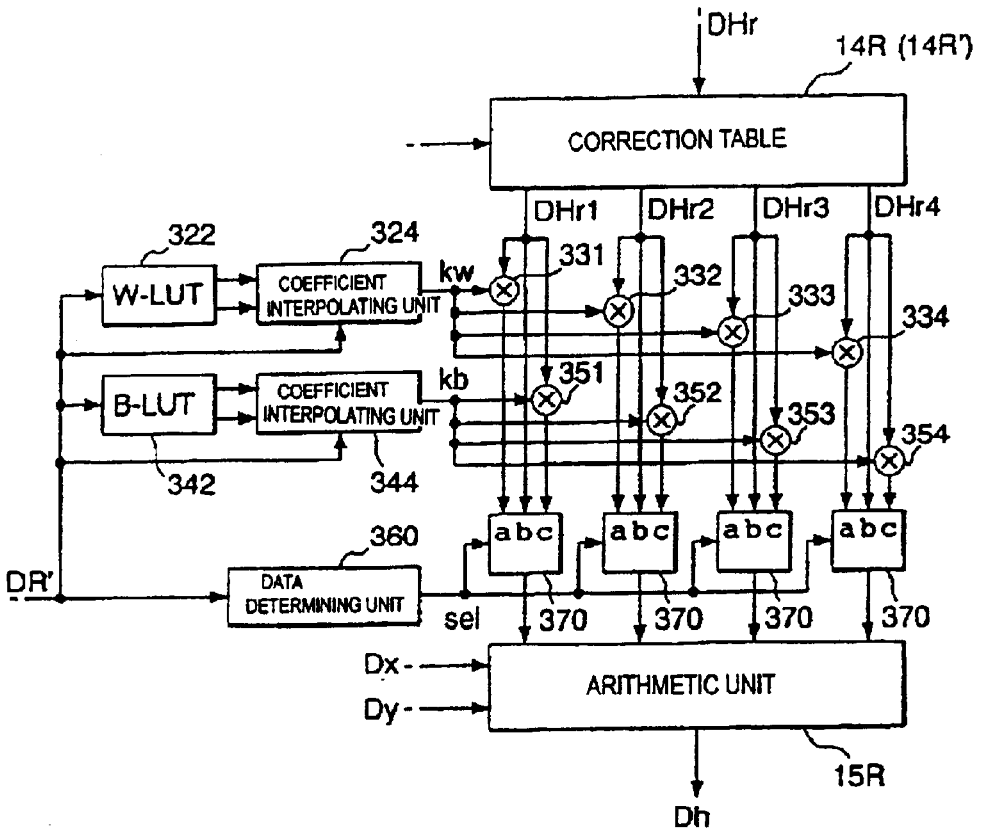
[FIG. 15]
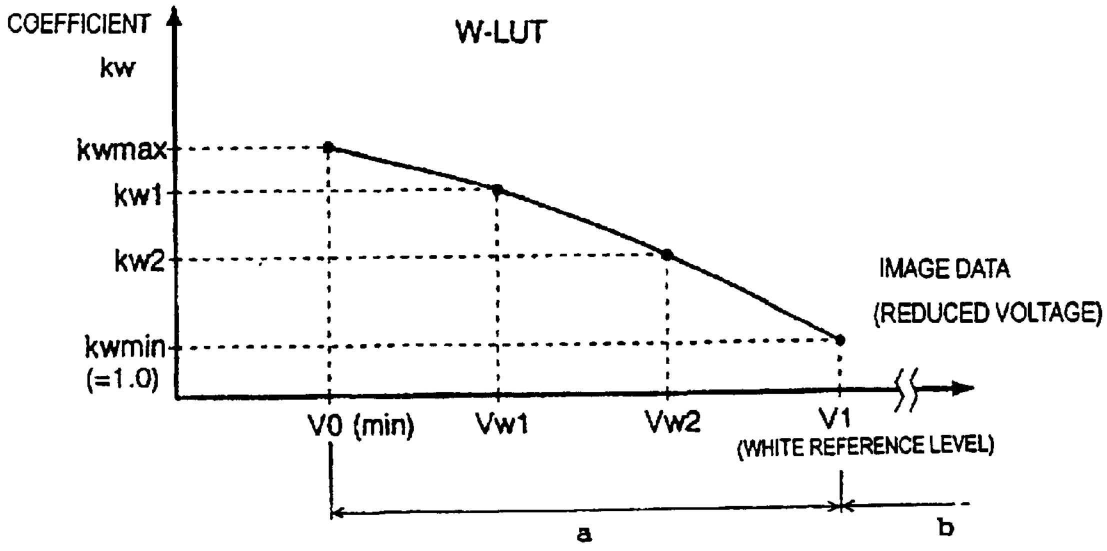

[FIG. 16]
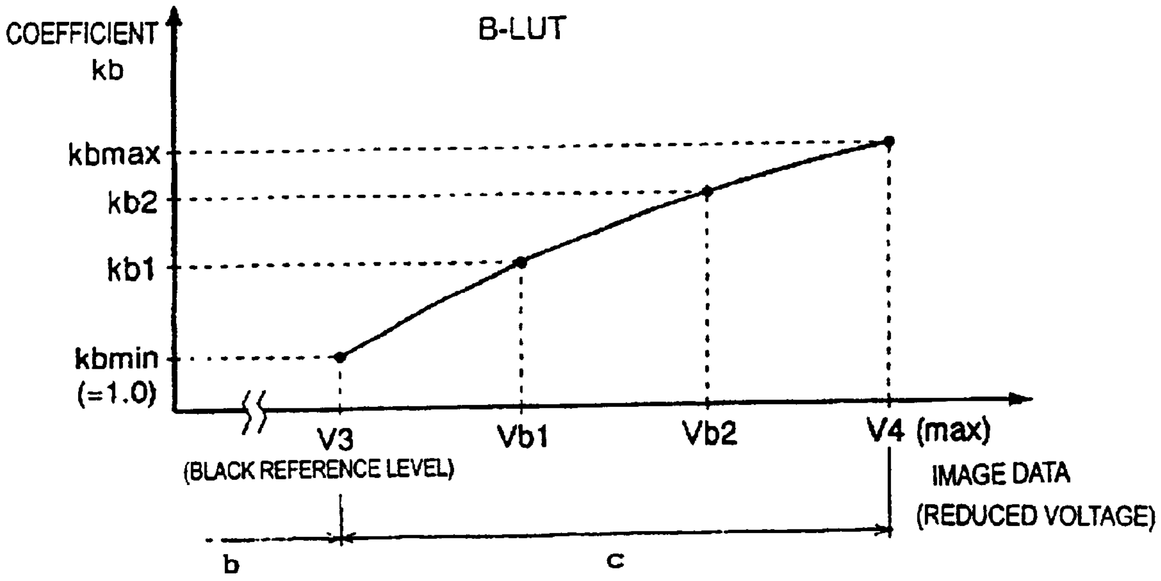
[FIG. 17]
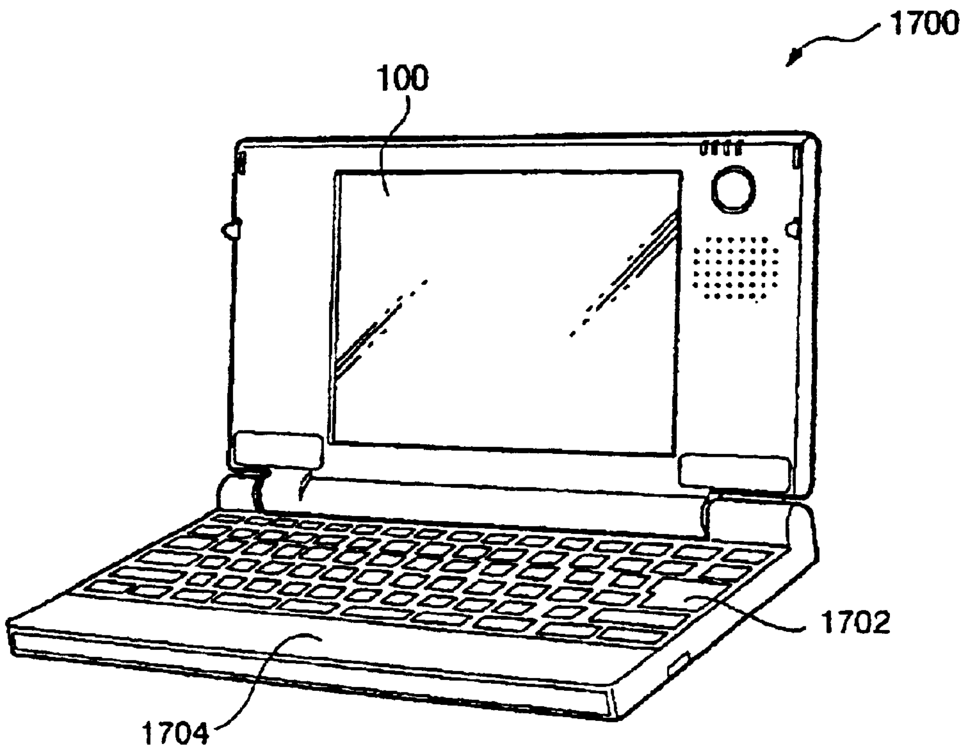

[FIG. 18]
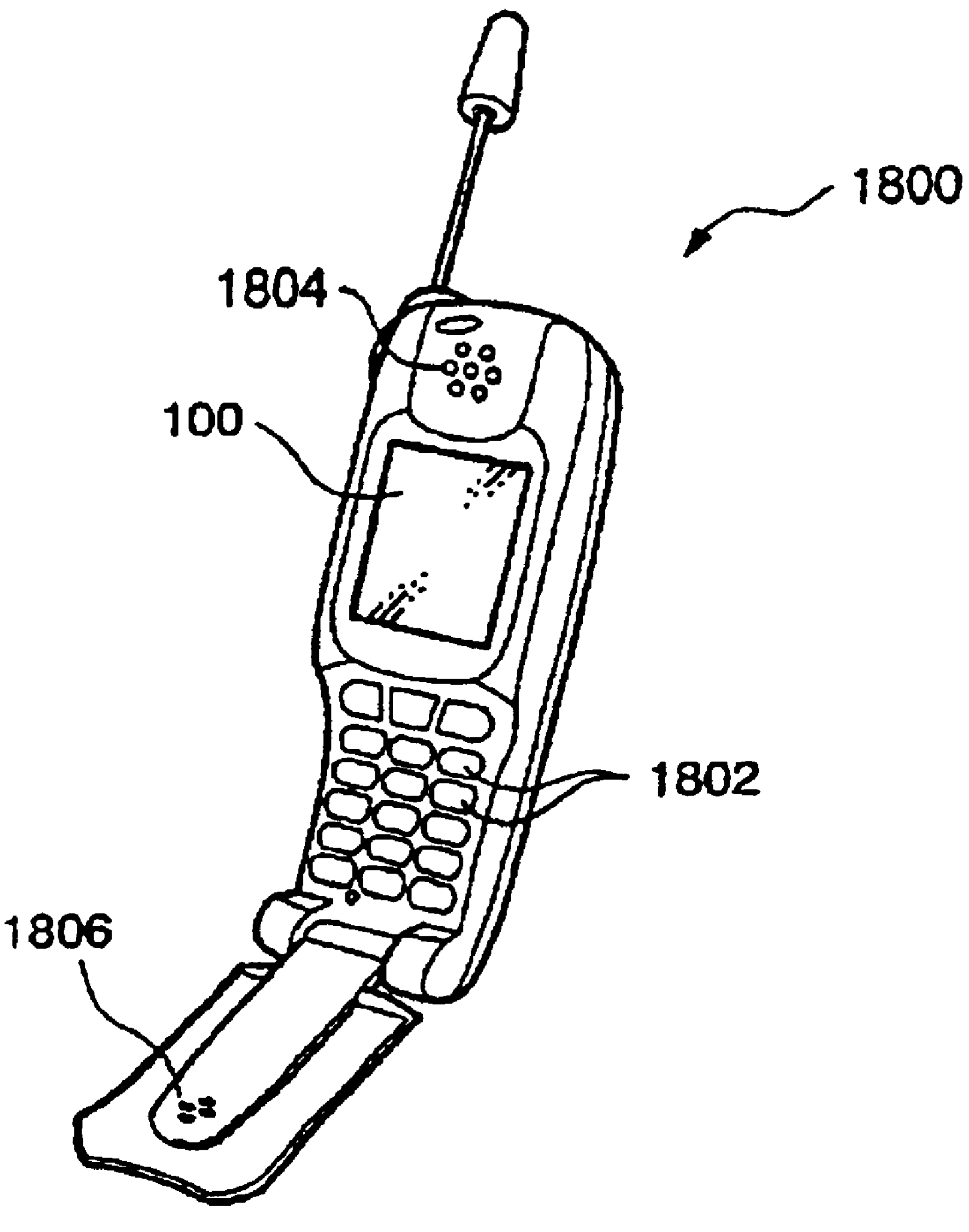

ELECTRO-OPTICAL APPARATUS, IMAGE PROCESSING CIRCUIT, IMAGE DATA CORRECTION METHOD, AND ELECTRONIC APPARATUS

BACKGROUND OF THE INVENTION

1. Field of Invention

The present invention relates to electro-optical apparatuses, image processing circuits, image data correction methods, and electronic apparatuses, in which nonuniformity of luminance, nonuniformity of color, and the like are suppressed.

2. Description of the Related Art

A conventional electro-optical apparatus is, for example, an active matrix liquid crystal display apparatus primarily formed of a liquid crystal panel, an image signal processing circuit, and a timing generating circuit. Among these elements, the liquid crystal panel is formed of a pair of substrates with a liquid crystal provided therebetween. Specifically, of the pair of substrates, one substrate is provided with a plurality of scanning lines and a plurality of data lines, in which the scanning lines and the data lines intersect each other and are electrically insulated from each other. At each of these intersections, a pair of a thin film transistor (hereinafter referred to as a "TFT"), which is an example of a switching device, and a pixel electrode is provided. The other substrate is provided with transparent counter electrodes (common electrodes) opposing the pixel electrodes. Hence, the liquid crystal display panel is maintained at a constant potential.

Opposing surfaces of the two substrates are provided with alignment layers, which are rubbed so that liquid crystal molecules are continuously twisted approximately 90 degrees in the major axis direction between the two substrates. Back surfaces of the two substrates are provided with polarizers in accordance with the alignment direction. With this arrangement, light passing through the pixel electrode and the counter electrode is rotated approximately 90 degrees along the twisting of the liquid crystal molecules when the effective value of a voltage applied across the two electrodes is zero. In contrast, as the voltage effective value increases, the liquid crystal molecules become tilted in the electric field direction, and hence the optical activity is lost. For example, in the transmissive type, when polarizers, in which their polarization axes meet at right angles in accordance with the alignment direction, are arranged on the incidence side and on the back side (in the case of a normally white mode), and when the effective value of the voltage applied across the electrodes is zero, the transmissivity reaches a maximum (white is displayed). In contrast, as the effective value of the voltage applied across the two electrodes increases, light is blocked and the transmissivity reaches a minimum (black is displayed).

In addition, the timing generating circuit outputs timing signals used by each component. The image signal processing circuit performs gamma correction processing, which is performed by converting image data input to a liquid crystal display device into voltage information corresponding to the gray scale value of the image data in accordance with transmissivity (or reflectivity) characteristics relative to the effective value of the voltage applied across the pixel electrode and the counter electrode. In general, the gamma correction processing is often performed by using a table storing a relationship between the input image data and the corrected image data.

Concerning an actual liquid crystal panel, liquid crystal layers are not uniform in thickness, and operating characteristics of the TFTs on the surfaces vary widely. For these reasons, nonuniformity of luminance occurs. Concerning techniques to decrease the nonuniformity of luminance, there is a technique in which a display region is appropriately divided into blocks, and tables are switched for the block units (for example, see Japanese Unexamined Patent Application Publication No. 3-18822).

Concerning such a technique, there is a technique in which, instead of preparing tables for all blocks, tables are prepared for predetermined blocks. For a block for which a table is not prepared, interpolation processing is performed based on tables for the neighboring blocks, and a table for that block is thus generated. Accordingly, the memory capacity required for the tables is reduced (for example, see Japanese Unexamined Patent Application Publication No. 5-64110).

SUMMARY OF THE INVENTION

In a technique for preparing a table for each block, the luminance level is adjusted in block units, and the correction is constant in the same block. It is thus impossible to perform highly accurate correction. A problem occurs wherein nonuniformity of luminance is not completely removed.

In contrast, when the number of blocks is increased and the number of tables to be prepared is increased, it is possible to reduce nonuniformity of luminance. In this case, a problem occurs wherein the memory capacity necessary for the tables is increased.

The present invention has been made in consideration of the foregoing problems. The object of the present invention is to provide an electro-optical apparatus, an image processing circuit, an image data correction method, and an electronic apparatus, that are capable of widely reducing the nonuniformity of luminance with the small storage capacity.

In order to achieve the above objects, an image data correction method according to a first aspect corrects nonuniformity of luminance in an image display region which displays an image in accordance with input image data. Reference correction data, which correspond to a plurality of specific levels among levels available for the input image data, are stored for each of a plurality of predetermined reference coordinates in the image display region. The reference correction data are interpolated according to the level to generate first correction data which correspond to the levels available for the input image data, for each of the plurality of reference coordinates. The first correction data are stored in correspondence to the reference coordinates and the levels. From the stored first correction data, data which correspond to a plurality of reference coordinates surrounding the coordinates of the input image data in the image display region and which correspond to the level of the input image data are selected. The selected first correction data are interpolated according to the coordinates to generate second correction data which correspond to the input image data. The second correction data are added to the input image data.

According to this method, pre-stored data are the reference correction data which correspond to the plurality of reference coordinates in the image display region and which correspond to the specific levels among the levels available for the input image data. Therefore, it is possible to reduce the necessary memory capacity. By interpolating the reference correction data according to the level, the first correction data are generated. By interpolating the first correction data according to the coordinates, the second correction data are generated. Accordingly, the input image data are corrected. Nonuniformity of luminance is corrected in correspondence to each level of the input image data and in correspondence to the coordinates of the input image data. It is thus possible to accurately reduce the nonuniformity of luminance.

In order to achieve the above objects, an image processing circuit according to a second aspect corrects nonuniformity of luminance in an image display region which displays an image in accordance with input image data. The image processing circuit includes a first storage device that stores reference correction data, which correspond to a plurality of specific levels among levels available for the input image data, for each of a plurality of predetermined reference coordinates in the image display region; a first interpolation device that interpolates the reference correction data according to the level to generate first correction data, which correspond to the levels available for the input image, for each of the plurality of reference coordinates; a second storage device that stores the first correction data in correspondence to the reference coordinates and the levels; a selecting device that selects, from the first correction data stored in the second storage device, data which correspond to a plurality of reference coordinates surrounding the coordinates of the input image data in the image display region and which correspond to the level of the input image data; a second interpolation device that interpolates the first correction data selected by the selecting device according to the coordinates to generate second correction data which correspond to the input image data; and an adding device that adds the second correction data to the input image data. With this arrangement, as in the first invention, nonuniformity of luminance is corrected in correspondence to each level of the input image data and in correspondence to the coordinates of the input image data. It is thus possible to accurately reduce the nonuniformity of luminance.

In order to achieve the above objects, an image processing circuit according to a third aspect corrects nonuniformity of luminance in an image display region which displays an image in accordance with input image data. The image processing circuit includes a memory that stores reference correction data, which correspond to a plurality of specific levels among levels available for the input image data, for each of a plurality of predetermined reference coordinates in the image display region; an interpolation processor that interpolates the reference correction data according to the level to generate first correction data, which correspond to the levels available for the input image data, for each of the plurality of reference coordinates; a correction table that stores the first correction data in correspondence to the reference coordinates and the levels; a selection circuit that selects, from the first correction data stored in the correction table, data which correspond to a plurality of reference coordinates surrounding the coordinates of the input image data in the image display region and which correspond to the level of the input image data; an arithmetic unit that interpolates the first correction data selected by the selection circuit to generate second correction data which correspond to the input image data; and an adder that adds the second correction data to the input image data. With this arrangement, as in the first and second aspects, nonuniformity of luminance is corrected in correspondence to each level of the input image data and in correspondence to the coordinates of the input image data. It is thus possible to accurately reduce the nonuniformity of luminance.

In the third aspect, a plurality of scanning lines extending in the X-direction, a plurality of data lines extending in the Y-direction, and pixels corresponding to intersections of the data lines and the scanning lines may be provided in the image display region. The selection circuit may include an X counter that counts a first clock signal used as a time basis for X-direction scanning in the image display region and generating X-coordinate data indicating the X-coordinate of a pixel that corresponds to the input image data in the image display region; a Y counter that counts a second clock signal used as a time basis for Y-direction scanning in the image display region and generating Y-coordinate data indicating the Y-coordinate of the pixel that corresponds to the input image data in the image display region; and an address generator that specifies a plurality of reference coordinates surrounding the coordinates of the input image data based on the X-coordinate data and the Y-coordinate data and generating addresses used to read pieces of corresponding correction data from the correction table based on the plurality of specified reference coordinates and the level of the input image data. Preferably, the arithmetic unit performs interpolation processing in accordance with the distance from the coordinates of the input image data, which are specified by the X-coordinate data and the Y-coordinate data, to the pieces of correction data read by the address generator. With this arrangement, it is possible to specify the coordinates of the input image data with certain timing in the image display region based on the X-coordinate data and the Y-coordinate data. The correction data, which correspond to the reference coordinates surrounding the coordinates of the input image data, are interpolated according to the coordinates, thus generating the second correction data corresponding to the coordinates of the input image data. It is thus possible to accurately correct nonuniformity of luminance in the input image data for each of the pairs of corresponding coordinates.

In this arrangement, the input image data may include data corresponding to each of the RGB colors. The reference correction data may include data corresponding to each of the RGB colors. The memory, the interpolation processor, the X counter, and the Y counter may be shared among the RGB colors. The correction table, the arithmetic unit, the address generator, and the adder may be provided for each of the RGB colors. The structure is thereby simplified.

In the third aspect, a plurality of scanning lines extending in the X-direction, a plurality of data lines extending in the Y-direction, and pixels formed of electrodes with a liquid crystal therebetween in correspondence to intersections of the data lines and the scanning lines may be provided in the image display region. The reference correction data corresponding to the specific levels may include correction data corresponding to first and second levels corresponding to first and second turning points at which a display characteristic curve indicating the transmissivity or reflectivity suddenly changes relative to the effective value of a voltage applied to the liquid crystal, and to at least one level between the first and second levels.

Furthermore, the interpolation processor may interpolate the reference correction data when generating the first correction data corresponding to each level ranging from the first level to the second level. The interpolation processor may use the reference correction data that corresponds to the first level when generating the first correction data corresponding to each level below the first level. The interpolation processor may use the reference correction data that corresponds to the second level when generating the first correction data corresponding to each level exceeding the second level. The correction table may store correction data for each level ranging from the first level to the second level.

The selection circuit may select, from the correction data stored in the correction table, the correction data that corresponds to the first level when the level of the input image data is below the first level. The selection circuit may select, from the correction data stored in the correction table, the correction data that corresponds to the level of the input image data when the level of the input image data is within the range of the first level to the second level. The selection circuit may select, from the correction data stored in the correction table, the correction table that corresponds to the second level when the level of the input image data exceeds the second level. Concerning a display characteristic of the liquid crystal, there are two turning points at which the characteristic polarity suddenly changes. Transmissivity relative to the applied voltage between these turning points changes greatly, whereas changes in transmissivity relative to the applied voltage are small in other ranges. When the level of the input image data is below the first level, the correction data corresponding to the first level is selected. When the gray scale of the input image data exceeds the second level, the correction data corresponding to the second level is selected. It is thus possible to generally correct nonuniformity of luminance.

However, when the level of the input image data is below the first level or exceeds the second level, it is preferable that the image processing circuit has the following arrangement in order to properly correct the nonuniformity of luminance. Specifically, when the level of the input image data is below the first level or exceeds the second level, the image processing circuit may further include a coefficient output unit that outputs a coefficient in accordance with the difference between the level of the input image data and one of the first level and the second level; and a multiplier that multiplies the coefficient output from the coefficient output unit by the correction data corresponding to the first or the second level, which is selected by the selection circuit. Preferably, the arithmetic unit uses the product obtained by the multiplier as the first correction data selected by the selection circuit. With this arrangement, when the level of the input image data is below the first level or above the second level, the correction data in correspondence to that level is properly generated. Hence, it is possible to correct nonuniformity of luminance. In this arrangement, the coefficient output unit may include a look up table that stores coefficients corresponding to at least two points in a region in which the level of the input image data is below the first level or in a region in which the level of the input image data exceeds the second level; and a coefficient interpolating unit that interpolates the coefficients stored in the look up table and obtaining a coefficient that corresponds to the input image data. With this arrangement, it is not necessary to store, in the look up table, a coefficient corresponding to each level in a region in which the level of the input image data is below the first level or in a region in which the level of the input image data exceeds the second level. It is thus possible to reduce the storage capacity required in the look up table.

In the third aspect, in order to accommodate colorization, the input image data may include data corresponding to each of the RGB colors, and the reference correction data may include data corresponding to each of the RGB colors. The interpolation processor may generate the first correction data in correspondence to each of the RGB colors. Preferably, the correction table, the arithmetic unit, and the adder are provided for each of the RGB colors. With this arrangement, nonuniformity of luminance in each of the RGB colors can be corrected.

Concerning human vision, sensitivity to G is greater than to R or to B. Preferably, the amount of the reference correction data for G is greater than the amount of the reference correction data for R or for B. It is thus possible to relatively reduce the amount of the reference correction data for R or for B compared with the reference correction data for G. The storage capacity required in the memory is also reduced.

Preferably, the reference correction data for R or for B correspond to coordinates extracted from the pairs of reference coordinates corresponding to the reference correction data for G based on specific rules.

An electro-optical apparatus according to an aspect of the present invention includes the above-described image processing circuit and a drive circuit that displays an image in the image display region based on the image data corrected by the image processing circuit. It is thus possible to remove nonuniformity of luminance and nonuniformity of color and to perform high-quality image display.

An electronic apparatus according to another aspect of the present invention includes the above-described electro-optical apparatus. In particular, when the electronic apparatus is used in a projector that enlarges and projects an image, it is possible to properly correct nonuniformity of luminance and nonuniformity of color, which is highly advantageous. The electronic apparatus is also suitable for use in a direct-view electronic apparatus, such as a display unit in a mobile computer or a cellular phone.

BRIEF DESCRIPTION OF THE DRAWINGS

FIG. 1 is a schematic of the electrical structure of a projector according to a first exemplary embodiment of the present invention;

FIG. 2 is a plan view of the structure of the projector;

FIG. 3 is a schematic of the structure of a color nonuniformity correction circuit in the projector;

FIG. 4 is an illustration showing reference coordinates in the first exemplary embodiment;

FIG. 5 is an illustration of the relationship between display characteristics of a liquid crystal panel and three voltage levels corresponding to reference correction data;

FIG. 6 is an illustration of the storage contents of a ROM in the color nonuniformity correction circuit in the projector;

FIG. 7 is an illustration of the structure of a system for generating the reference correction data used in the color nonuniformity correction circuit;

FIG. 8 is an illustration of the storage contents of a correction table in the color nonuniformity correction circuit;

FIG. 9 is a flowchart showing the operation of the color nonuniformity correction circuit;

FIG. 10 is a schematic of the structure of a color nonuniformity correction circuit according to a second exemplary embodiment of the present invention;

FIG. 11 is an illustration showing reference coordinates in the second exemplary embodiment;

FIG. 12 shows the storage contents of a ROM in the color nonuniformity correction circuit;

FIG. 13 shows the storage contents of a correction table corresponding to R in the color nonuniformity correction circuit;

FIG. 14 is a block diagram of the structure of basic portions of an interpolation processor according to a third exemplary embodiment of the present invention;

FIG. 15 shows the storage contents of a W-LUT in the interpolation processor;

FIG. 16 shows the storage contents of a B-LUT in the interpolation processor;

FIG. 17 is a perspective view of a personal computer as an example of an electronic apparatus in which an image processing circuit is used; and FIG. 18 is a perspective view of the structure of a cellular phone as an example of an electronic apparatus in which the image processing circuit is used.

DETAILED DESCRIPTION OF PREFERRED EMBODIMENTS

Embodiments of the present invention are described hereinafter.

Electrical Structure of Projector

A first exemplary embodiment of the present invention is described. The first exemplary embodiment is an example of an electro-optical apparatus, which is a projector for enlarging and projecting an image synthesized from transmitted images produced by an active matrix liquid crystal panel.

1.1 Electrical Structure of Projector

FIG. 1 is a block diagram of the electrical structure of a projector. As shown in the drawing, a projector 1100 includes three liquid crystal display panels 100R, 100G, and 100B, a timing circuit 200, and an image signal processing circuit 300.

Among these components, the liquid crystal display panels 100R, 100G, and 100B correspond to the primary colors, that is, to R (red), G (green), and B (blue). Each of the liquid crystal display panels 100R, 100G, and 100B is formed of a device substrate and a counter substrate with a liquid crystal provided therebetween. In the peripheral area of a display region 103 on the device substrate, a data line drive circuit 101 and a scanning line drive circuit 102 are formed. In contrast, on the display region 103 on the device substrate, a plurality of data lines are formed in the transverse direction (X direction) and a plurality of scanning lines are formed in the longitudinal direction (Y direction). A TFT functioning as a switching device is formed corresponding to the intersection of each data line and each scanning line. A gate electrode of the TFT is connected to the scanning line, a source electrode is connected to the data line, and a drain electrode is connected to a pixel electrode. A pixel is formed by the TFT, the pixel electrode, and a counter electrode formed on the counter substrate.

The data line drive circuit 101 and the scanning line drive circuit 102 are configured to drive the data lines and the scanning lines, respectively, which are formed in the display region 103. In the present invention, there may be any number of dots in the display region 103. In the first exemplary embodiment, the XGA (1024 dots×768 dots) is used in order to simplify the description.

The timing circuit 200 supplies various timing signals to the data line drive circuit 101, the scanning line drive circuit 102, and the image signal processing circuit 300. The image signal processing circuit 300 includes a gamma correction circuit 301, a color nonuniformity correction circuit 302, S/P conversion circuits 303R, 303G, and 303B, and inverter/amplifier circuits 304R, 304G, and 304B.

Among these components, the gamma correction circuit 301 outputs, relative to input digital image data DR, DG, and DB, image data DR', DG', and DB' which have undergone gamma correction in accordance with display characteristics of the liquid crystal panels 100R, 100G, and 100B, respectively. Subsequently, the color nonuniformity correction circuit 302 correct nonuniformity of color of the image data DR', DG', and DB', which is described hereinafter. Also the color nonuniformity correction circuit 302 performs D/A conversion of the corrected data and outputs image signals VIDR, VIDG, and VIDB.

When the image signal VIDR through one line is input to the S/P conversion circuit 303R corresponding to R, the S/P conversion circuit 303R divides it into signals through six lines. Also the S/P conversion circuit 303R performs time-based prolongation (serial-parallel conversion) of the signals so that they are six times as long as the original signal and outputs the resultant signals. The image signal through one line is converted into the image signals through six lines in order to increase duration in which the image signals are applied to the TFTs in a sampling circuit (included in the data line drive circuit 101) of the liquid crystal display panel, thereby enabling the liquid crystal display panel to have a sufficient sampling time for data signals and a sufficient charging/discharging time. Since this part is not directly related to the present invention, description thereof is omitted.

The inverter/amplifier circuit 304R corresponding to R inverts the image signals, amplifies the inverted image signals, and supplies the amplified image signals as image signals VIDr1 to VIDr6 to the liquid crystal display panel 100R.

Concerning the image signal VIDG for G obtained by the color nonuniformity correction circuit 302, the image signal VIDG is similarly converted by the S/P conversion circuit 303G into signals through six lines. The image signals through six lines are inverted and amplified by the inverter/amplifier circuit 304G, and the resultant signals are output as image signals VIDg1 to VIDg6 to the liquid crystal display panel 100G. Similarly, concerning the image signal VIDB for B, the image signal VIDB is converted by the S/P conversion circuit 303B into signals through six lines. The image signals through six lines are inverted and amplified by the inverter/amplifier circuit 304B, and the resultant signals are output as image signals VIDb1 to VIDb6 to the liquid crystal display panel 100B.

The inversion performed by the inverter/amplifier circuits 304R, 304G, and 304B is to alternately invert the voltage level on the basis of the amplitude central potential of the image signal. Whether to invert the image signal is determined in accordance with whether a data signal application mode is (1) inversion in scanning line units, (2) inversion in data signal line units, or (3) inversion in pixel units. The inversion period is set to one horizontal scanning interval or to a dot clock period.

1.2 Mechanical Construction of Projector

The mechanical construction of the projector is described next. FIG. 2 is a plan view of the structure of the projector.

As shown in the drawing, a lamp unit 1102 formed by a white light source, such as a halogen lamp, is provided in the projector 1100. Incident light emitted from the lamp unit 1102 is separated into the primary colors R, G, and B by four mirrors 1106 and two dichroic mirrors 1108 arranged in a light guide 1104, and the separated light rays enter the liquid crystal display panels 100R, 100B, and 100G which function as light valves.

The R, G, and B image signals (VIDr1 to VIDr6, VIDg1 to VIDg6, and VIDb1 to VIDb6) processed by the image signal processing circuit 300 (omitted in FIG. 2) are supplied to the liquid crystal panels 100R, 100B, and 100G, respectively. Accordingly, the liquid crystal panels 100R, 100G, and 100B function as light modulators for generating respective images in the primary colors R, G, and B.

Light modulated by the liquid crystal panels 100R, 100G, and 100B enter a dichroic prism 1112 from three directions.

Concerning the dichroic prism 1112, R and B light is refracted 90 degrees and G light goes straight. Accordingly, an image synthesized from the primary color images is projected through a projector lens 1114 onto a screen or the like. Since light corresponding to the primary colors R, G, and B enter the respective liquid crystal panels 100R, 100B, and 100G, a color filter is not necessary as it is in a direct-view panel.

1.3 Structure of Color Nonuniformity Correction Circuit

The detailed structure of the color nonuniformity correction circuit 302 shown in FIG. 1 is described next. FIG. 3 is a block diagram of the structure of the color nonuniformity correction circuit 302. As shown in the drawing, the color nonuniformity correction circuit 302 includes an X counter 10, a Y counter 11, a ROM (Read Only Memory) 12, an interpolation processor 13, and correction units UR, UG, and UB.

The X counter 10 counts dot clock signals DCLKs in synchronization with a dot cycle and outputs X-coordinate data Dx indicating the X coordinate of input image data. In contrast, the Y counter 11 counts horizontal clock signals HCLKs in synchronization with horizontal scanning and outputs Y-coordinate data Dy indicating the Y coordinate of the input image data. It is thus possible to determine the coordinates of a dot (pixel) corresponding to the input image data by referring to the X-coordinate data and the Y-coordinate data.

The ROM 12 is a non-volatile memory. When the power supply to the projector 1100 is switched on, the ROM 12 outputs reference correction data Dref. Each piece of the reference correction data Dref corresponds to a plurality of predetermined reference coordinates and to a specific level for each of the RGB colors. The reference correction data Dref is used as the basis for correcting nonuniformity of color.

The reference coordinates in the first exemplary embodiment are described. FIG. 4 is a conceptual diagram for illustrating the reference coordinates in connection with the display region 103. As described above, the display region 103 in the first exemplary embodiment is formed by 1024 dots×768 dots. The display region 103 is divided into 8 blocks×6 blocks. In the first exemplary embodiment, a total of 63 coordinate points (indicated by black dots in the drawing) at the apices of these blocks are referred to as reference coordinates.

A specific level for each of the RGB colors is described next. In general, liquid crystal display panels have display characteristics in accordance with compositions of liquid crystals which are electro-optical materials. When all levels available for image data are corrected by using correction data corresponding to a certain level of the image data, it is impossible to perform accurate correction. For example, when correction data optimized at the center (gray) level is used to correct all the levels of image data, it is impossible to perform accurate correction, particularly at the black level or at the white level. Hence, it is not possible to suppress nonuniformity of luminance at those levels. In contrast, although it would be ideal to store correction data corresponding to all the levels of image data, the storage capacity required in the ROM 12 would be increased. Therefore, in the first exemplary embodiment, the reference correction data Dref corresponding to three different levels are stored, and correction data corresponding to levels other than these three levels is obtained by interpolating the stored reference correction data Dref.

This will be described in detail. FIG. 5 shows a display characteristic W indicating the relationship between transmissivity (or reflectivity) and the effective value of a voltage applied to a liquid crystal capacitor, showing the points of the voltage levels corresponding to the reference correction data Dref. This drawing shows a normally white mode in which the transmissivity reaches a maximum (white is displayed) when the effective value of the voltage applied to the liquid crystal capacitor is zero.

As shown in the drawing, concerning the display characteristic W, the transmissivity gradually decreases as the effective value of the voltage applied to the liquid crystal capacitor is gradually increased from zero. When the effective value exceeds voltage level V1, the transmissivity suddenly decreases. When the effective value exceeds voltage level V3, the transmissivity gradually decreases. Voltage level V0 is the effective value of the voltage applied to the liquid crystal capacitor when image data is at a minimum level. Voltage level V4 is the effective value of the voltage applied to the liquid crystal capacitor when image data is at a maximum level. Concerning the display characteristic W, the reference correction data Dref in the first exemplary embodiment is set relative to voltage levels V1, V2, and V3 by a technique described hereinafter. Voltage levels V1 and V3 correspond to points at which the display characteristic W suddenly changes. Voltage level V2 correspond to a point at which the transmissivity becomes approximately 50%.

The reason for choosing three voltage levels is as follows. First, in a region below voltage level V1 or in a region above voltage level V3, the change in transmissivity is small even when the levels (gray scales) of the image data differ greatly. It is therefore concluded that interpolation can be satisfactorily performed by using the reference correction data Dref corresponding to voltage level V1 or V3. Second, if the reference correction data Dref corresponding to voltage levels V0 and V4, instead of voltage levels V1 and V3, are stored and correction data corresponding to each level within the range of voltage levels V0 to V4 is computed by interpolation, it is not possible to accurately compute the correction data in the entire range since the display characteristic W suddenly changes at voltage levels V1 and V3. Third, it is possible to improve the accuracy in interpolation by using voltage level V2 at which the transmissivity becomes approximately 50%.

In the following description, voltage level V1 is referred to as a white reference level, voltage level V2 is referred to as the center reference level, and voltage level V3 is referred to as a black reference level. In this example, the reference correction data Dref are provided in correspondence to the white reference level, the center reference level, and the black reference level. It is also possible to provide reference correction data Dref corresponding to points separating the range of the white reference level to the black reference level.

The storage contents of the ROM 12 are described next. FIG. 6 shows the storage contents of the ROM 12.

As shown in the drawing, the ROM 12 stores nine pieces of reference correction data Dref for each of 63 pairs of reference coordinates. Specifically, nine pieces of reference correction data Dref corresponding to a pair of reference coordinates are stored in correspondence to each of the RGB colors, and further in correspondence to the white reference level, the center reference level, and the black reference level.

In the drawing, the first subscripts "R", "G", and "B" after the letter "D" (which indicates data) indicate the color to which the data corresponds. Among the second subscripts, "w" indicates that the data corresponds to the white reference level, "c" indicates that the data corresponds to the center reference level, and "b" indicates that the data corresponds to the black reference level. The third and fourth subscripts "i,j" indicate the reference coordinates to which the data corresponds. For example, "DRc256,1" indicates that the reference correction data corresponds to R (red), to the center reference level, and to the reference coordinates (256,1).

In the following description, concerning the reference correction data, when distinguishing among the RGB colors, the reference correction data corresponding to R is referred to as Drefr, the reference correction data corresponding to G is referred to as Drefg, and the reference correction data corresponding to B is referred to as Drefb. When it is not necessary to distinguish among the RGB colors, the reference correction data is simply referred to as Dref.

Setting of the reference correction data Dref is described next. FIG. 7 is an illustration of the structure of a system used when setting the reference correction data Dref.

A system 1000 shown in the drawing includes the projector 1100 according to the first exemplary embodiment, a CCD camera 500, a personal computer 600, and a screen S. The color nonuniformity correction circuit 302 is deactivated. In the system 1000, the CCD camera 500 captures an image projected by the projector 1100 onto the screen S. The CCD camera 500 converts the image and outputs it as an image signal Vs. The personal computer 600 analyzes the image signal Vs and generates reference correction data Dref by a process described below.

A signal generator (not shown) is connected to the system 1000. Image data DR' corresponding to R and to the white reference level is supplied to the system (concerning image data DG' and DB', they are fixed in correspondence to voltage level V4 at which the transmissivity is the lowest). Accordingly, the screen S displays a solid red image.

Next, the image is captured by the CCD camera 500, and the captured image is supplied as the image signal Vs to the personal computer 600. Based on the image signal Vs, the personal computer 600 divides a single-frame screen into 6 blocks×8 blocks, as shown in FIG. 4, and obtains the average luminance level in each block. Based on the obtained average luminance level, the personal computer 600 computes the luminance level at each pair of reference coordinates. Specifically, the personal computer 600 obtains the luminance level on a certain pair of reference coordinates by taking an average of one, two, or four blocks adjacent to those reference coordinates.

Subsequently, the personal computer 600 compares the luminance level on the reference coordinates with a predetermined luminance level. Based on the comparison result, the personal computer 600 computes the reference correction data Dref. The personal computer 600 performs this computing operation for all 63 pairs of the reference coordinates. Similarly, the personal computer 600 further performs the computing operation for the center reference level (voltage level V2) and the black reference level (V3) and computes the reference correction data Drefr corresponding to R.

Successively, the image data DR' and DB' are fixed in correspondence to voltage level V4 at which the transmissivity is the lowest. The image data DG' corresponding to G is sequentially changed so as to correspond to the white reference level, to the center reference level, and to the black reference level. The personal computer 600 is caused to compute the reference correction data Drefg corresponding to G. Similarly, the image data DR' and DG' are fixed in correspondence to voltage level V4 at which the transmissivity is the lowest. The image data DB' corresponding to B is sequentially changed so as to correspond to the white reference level, the center reference level, and the black reference level. The personal computer 600 is caused to compute the reference correction data Drefb corresponding to B. The reference correction data Drefr, Drefg, and Drefb as computed above are stored in the ROM 12 in the projector 1100.

Referring again to FIG. 3, the interpolation processor 13 performs interpolation processing of the reference correction data Dref corresponding to the white reference level, the center reference level, and the black reference level. Accordingly, the interpolation processor 13 computes correction data DH for each pair of reference coordinates and for each of the RGB colors.

Specifically, the interpolation processor 13 computes the correction data DH corresponding to each level ranging from the white reference level to the center reference level based on the reference correction data Dref corresponding to the white reference level and the reference correction data Dref corresponding to the center reference level. Similarly, the interpolation processor 13 computes the correction data DH corresponding to each level ranging from the center reference level to the black reference level based on the reference correction data Dref corresponding to the center reference level and the reference correction data Dref corresponding to the black reference level.

The interpolation processor 13 in the first exemplary embodiment is configured to compute the correction data DH by linear interpolation. For example, the correction data DH corresponding to voltage level Va (V1<Va<V2), to a pair of coordinates (i,j), and to R is given by the following equation, that is, DH=(DRwi,j)·(Va−V1)/(V2−V1)+(DRci,j)·(V2−Va)/(V2−V1).

Therefore, the correction data DH corresponding to each level ranging from the white reference level (voltage level V1) to the black reference level (voltage level V3) is computed by the interpolation processor 13 for each pair of reference coordinates. In the following description, the correction data DH corresponding to the RGB colors are referred to as DHr, DHg, and DHb, respectively.

Next, the correction units UR, UG, and UB perform correction processing of the image data DR', DG', and DB' corresponding to the RGB colors based on the correction data generated by the above-described interpolation processor 13. Also, the correction units UR, UG, and UB perform DA conversion of the corrected data and output the converted data as image signals VIDR, VIDG, and VIDB. In the first exemplary embodiment, the correction units UR, UG, and UB have the same structure. Hence, the correction unit UR is described by way of example. The correction unit UR includes a correction table 14R, an arithmetic unit 15R, an adder 16R, an address generator 17R, and a DA converter 18R.

Among these components, the correction table 14R is structured so as to store the correction data DHr obtained by the interpolation processor 13 in a region having the reference coordinates as a row address and the level direction as a column address. At the same time, the correction table 14R outputs four pieces of correction data DHr1 to DHr4 from a storage region specified by a read-out address.

The storage contents of the correction table 14R are described with reference to FIG. 8. In the drawing, "m" denotes image data corresponding to voltage level V1, and "n" denotes image data corresponding to voltage level V3. As shown in the drawing, the correction table 14R stores the correction data DHr in correspondence to the reference coordinates. The first and second subscripts "i,j" following the correction data DHr indicate the corresponding reference coordinates. The third subscript "(X)" indicates the level of the corresponding image data. For example, "DHr1,128(m+2)" indicates that the correction data corresponds to the reference coordinates (1,128) and to the image data level (m+2).

The address generator 17R successively generates four read-out addresses by a process described below based on the X-coordinate data Dx, the Y-coordinate data Dy, and the image data DR'.

Specifically, the address generator 17R first specifies the reference coordinates of four points positioned in the neighborhood of the coordinates specified by the X-coordinate data Dx and the Y-coordinate data Dy. For example, when the coordinates specified by the X-coordinate data Dx and the Y-coordinate data Dy are (64,64) (see FIG. 4), four pairs of reference coordinates (1,1), (128,1), (1,128), and (128, 128) are specified. Accordingly, four row addresses designating the first row, the second row, the tenth row, and the eleventh row are generated.

Second, the address generator 17R generates a column address corresponding to the level of the image data DR'. For example, when the level of the image data DR' is "m+1", a column address designating the second column is generated. When the level of the image data DR' falls below "m", a column address designating the first column is generated. When the level of the image data DR' exceeds "n", a column address corresponding to "n" is generated.

Third, the address generator 17R generates four read-out addresses by combining four row addresses and one column address.

Subsequently, the address generator 14R selects the four pieces of correction data DHr1 to DHr4 from the correction data DHr stored in the correction table 14R. For example, when the level of the image data DR' is "m+1" and the coordinates specified by the X-coordinate data and the Y-coordinate data are (64,64), as shown in FIG. 8, "DHr1, 1(m+1)", "DHr128,1(m+1)", "DHr1,128(m+1)", and "DHr128,128(m+1)" are read from the correction table 14R as the correction data DHr1 to DHr4.

The arithmetic unit 15R shown in FIG. 3 uses the four pieces of read correction data DHr1 to DHr4 and obtains correction data Dh that will correspond to the coordinates (coordinates corresponding to the image data DR') specified by the X-coordinate data and the Y-coordinate data by interpolation processing. Specifically, the arithmetic unit 15R performs linear interpolation of the four pieces of correction data DHr1 to DHr4 in accordance with distances from the coordinates specified by the X-coordinate data Dx and the Y-coordinate data Dy to the coordinates corresponding to the correction data DHr1 to DHr4, respectively. Hence, the correction data Dh is obtained.

The adder 16R adds the image data DR' and the correction data Dh to generate corrected image data. The corrected image data is output through the DA converter 18R as an analog image signal VIDR.

In this description, the case in which the R (red) image data DR' is corrected is described. Concerning the G (green) image data DG' and the B (blue) image data DB', similar color nonuniformity correction processing is performed, and hence the image data DG' and DB' are output as analog image signals VIDG and VIDB.

1.4 Operation of Color Nonuniformity Correction Circuit

The operation of the color nonuniformity correction circuit 302 is described next. FIG. 9 is a flowchart showing the operation of the color nonuniformity correction circuit 302. Although the color nonuniformity correction corresponding to R is described in this example, similar description applies for B and G.

When the power supply to the projector 1100 is switched on (step S1), the reference correction data Dref (Drefr, Drefg, and Drefb) corresponding to the reference coordinates are read from the ROM 12 (step S2). Next, the interpolation processor 13 performs interpolation processing according to the gray scale (level) based on the reference correction data Dref and generates the correction data DHr, DHg, and DHb (step S3). Specifically, since the reference correction data Drefr, Drefg, and Drefr correspond to only three voltage levels V1, V2, and V3 among the 63 reference coordinate pairs, the correction data DHr, DHg, and DHb corresponding to each level ranging from voltage level V1 to voltage level V3 are generated by interpolation processing.

After a predetermined period of time passes and the correction data DHr, DHg, and DHb are stored in the correction tables of the correction units UR, UG, and UB, the dot clock signal DCLK is supplied to the X counter 10 and the horizontal clock signal HCLK is supplied to the Y counter 11 (step S4). In synchronization with these clock signals, the image data DR', DG', and DB' are supplied. At this point, it is indicated by the X-coordinate data Dx output from the X counter 10 and the Y-coordinate data Dy output from the Y counter 11 that the image data DR', DG', and DB' with certain timing correspond to which dot in the image display region.

Subsequently, the four pieces of correction data DHr1 to DHr4, which are used as the basis for interpolation processing according to the coordinates, are read from the correction table 14R based on the X-coordinate data Dx, the Y-coordinate data Dy, and the level of the image data DR' (step S5). Similar description applies for the other colors.

Afterwards, the correction data DHr1 to DHr4 are interpolated by the arithmetic unit 15R based on the X-coordinate data Dx and the Y-coordinate data Dy (step S6) and the correction data Dh is generated (step S7). The correction data Dh and the image data DR' are added by the adder 16R (step S8). Analog conversion of the sum is performed by the DA converter 18R, and the converted data is output as the R (red) image signal VIDR. Concerning G (green) and B (blue), similar processing is performed and the resultant data are output as the image signals VIDG and VIDB, respectively.

According to the color nonuniformity correction circuit 302 of the first exemplary embodiment, the correction data DH corresponding to each level of the image data is generated for each pair of reference coordinates based on the reference correction data Dref corresponding to each pair of reference coordinates and to three voltage levels V1, V2, and V3. Also, interpolation processing of four pieces of correction data DHr1 to DHr4 is performed in accordance with the X-coordinate data Dx and the Y-coordinate data Dy, thus generating the correction data Dh. Therefore, correction is performed in a careful and fine manner in accordance with each level of the image data DR', DG', and DB', and it is thus possible to substantially reduce nonuniformity of color and nonuniformity of luminance on the entire gray scales.

Since generation of the correction data Dh is performed for each of the image data DR', DG', and DB', it is possible to maintain the balance by compensating for, for example, insufficient correction of R by correcting G and B. For example, when the number of bits of the image data DR', DG', and DB' is ten, and when the number of bits of the correction data Dh is limited to four, nonuniformity of color may not be completely corrected by correcting each color. However, when correction is performed in consideration of the balance with the other colors, nonuniformity of color can be removed.

Furthermore, since interpolation processing corresponding to the coordinates is performed subsequent to performing interpolation processing corresponding to the level, that is, two-step interpolation is performed, the memory capacities required in the ROM 12 and the correction table 14R are greatly reduced.

In addition, since the X counter 10, the Y counter 11, the ROM 12, and the interpolation processor 13 are shared by the correction units UR, UG, and UB, the structure is further simplified and the cost is reduced.

According to the first exemplary embodiment, the color nonuniformity correction circuit 302 is provided at a subsequent stage of the color gamma correction circuit 301. Needless to say, the two components can be provided in the reverse order. In this case, the image data DR, DG, and DB are input to the color nonuniformity correction circuit 302 to correct nonuniformity of color, and then gamma correction is performed.

2. Second Exemplary Embodiment

A second exemplary embodiment of the present invention is described next. The mechanical construction of a projector according to the second exemplary embodiment is the same as that of the first exemplary embodiment shown in FIG. 2. The electrical structure of the projector of the second exemplary embodiment is the same as that of the first exemplary embodiment shown in FIGS. 1 and 3 except for provision of a color nonuniformity correction circuit 302' instead of the color nonuniformity correction circuit 302.

2.1 Structure of Color Nonuniformity Correction Circuit

FIG. 10 is a block diagram of the structure of basic portions of the color nonuniformity correction circuit 302' of the second exemplary embodiment. The basic mechanism of the color nonuniformity correction circuit 302' is the same as the color nonuniformity correction circuit 302 of the first exemplary embodiment. Specifically, the color nonuniformity correction circuit 302' stores reference correction data Dref (Drefr, Drefg, and Drefb) in advance and interpolates the reference correction data Dref (Drefr, Drefg, and Drefb) according to the level using an interpolation processor 13 to generate correction data DHr, DHg, and DHb. In addition, the color nonuniformity correction circuit 302' corrects nonuniformity of color based on the correction data DHr, DHg, and DHb to generate image signals VIDR, VIDG, and VIDB.

However, the color nonuniformity correction circuit 302' differs from the color nonuniformity correction circuit 302 of the first exemplary embodiment in that a ROM 12' with a small storage capacity is used instead of the ROM 12 and in that correction tables 14R' and 14B' with small storage capacities are used instead of the correction tables 14R and 14B.

Human vision characteristics are such that sensitivity to G (green) is greater than to R (red) or to B (blue). Therefore, sensitivity to nonuniformity of color is highest for G. Even when R and B are nonuniform in color at an almost imperceptible degree, comparable nonuniformity of color is noticeable in G. In other words, the display quality when synthesizing an image from images in the primary colors RGB is improved by setting the accuracy in interpolating nonuniformity of color higher for G than for R and B.

Nonuniformity of color is corrected based on the reference correction data Drefr, Drefg, and Drefb, as described above. The greater the amount of these data, the more the correction accuracy is improved. At the same time, there is a limit to the storage capacity of the ROM 12' for storing these data. The larger the storage capacity, the higher the cost.

Therefore, the storage capacity of the ROM 12' is determined in order to balance the cost with the correction accuracy. The second exemplary embodiment takes this point into consideration. By setting the ratio among the reference correction data Drefr, Drefg, and Drefb in accordance with human vision characteristics, greatest visual advantages are achieved by using the ROM 12' with a limited storage capacity. In the following description, the ROM 12' and the correction tables 14R' and 14B' used in the color nonuniformity correction circuit 302' are mainly described.

FIG. 11 is a conceptual diagram showing reference coordinates in the second exemplary embodiment in connection with a display region 103. As shown in the drawing, the display region 103 is formed of 1024 dots×768 dots. The display region 103 is divided into 8 blocks×6 blocks. A total of 63 coordinate points (indicated by black dots and circled dots in the drawing) at the apices of these blocks are referred to as reference coordinates for G. Concerning reference coordinates for R and B, there are only twenty points, which are indicated by circled dots. Specifically, the reference coordinates for R and B are extracted from the reference coordinates for G based on specific rules.

The reference correction data Drefr for R and the reference correction data Drefb for B are stored in correspondence to 20 pairs of reference coordinates, respectively. When this is compared with the reference correction data Drefg for G stored in correspondence to 63 pairs of reference coordinates, the amount of data for R and B is reduced to 20/63 (≈⅓).

The manner in which the reference correction data Drefr, Drefg, and Drefb are stored in the ROM 12' of the second exemplary embodiment is described with reference to FIG. 12. As shown in the drawing, concerning G, a trio of reference correction data "DGwi,j", "DGci,j", and "DGbi,j" is stored in the ROM 12' for each of 63 pairs of reference coordinates. Concerning R, a trio of reference correction data "DRwi,j", "DRci,j", and "DRbi,j" is stored in the ROM 12' for each of 20 pairs of reference coordinates. Similarly, concerning B, a trio of reference correction data "DBwi,j", "DBci,j", and "DBbi,j" is stored for each of 20 pairs of reference coordinates.

Accordingly, the reference correction data Drefr and Drefb are stored at (1,1), (256,1), (512,1), (768,1), and (1024,1) among the reference coordinates (1,1), (128,1), . . . , and (1024,1) in the first row shown in FIG. 11. The reference correction data Drefr and Drefb are not stored in the second row. From the third row onward, the reference coordinates are similarly reduced as they were in the first and second rows. The storage capacity required in the ROM 12', compared with a case in which data on all the reference coordinates are stored, is reduced to (20+63+20)/(63+63+63), i.e., approximately 54%. The storage capacity required in the ROM 12' is substantially reduced.

The manner in which the correction data DHr, which is generated by interpolating the reference correction data Drefr, is stored in the correction table 14R' is described with reference to FIG. 13. As shown in the drawing, the correction data DHr is stored in the correction table 14R' for each of 20 pairs of reference coordinates. Also, the correction data DHr is stored in correspondence to voltage levels ranging from voltage level V1, which corresponds to the first row, to voltage level V3, which corresponds to an n-th row.

In the first exemplary embodiment, concerning R, G, and B, the reference correction data Drefr, Drefg, and Drefb are stored in correspondence to 63 pairs of reference coordinates. The reference correction data Drefr, Drefg, and Drefb are interpolated according to the level to generate the correction data DHr, DHg, and DHb. In contrast, in the second exemplary embodiment, concerning R and B, the reference correction data Drefr and Drefb are stored in correspondence to 20 pairs of reference coordinates. The reference correction data Drefr and Drefb are interpolated according to the level for generating the correction data DHr and DHb. Therefore, in the second exemplary embodiment, the amount of the correction data DHr and DHb is reduced to approximately ⅓ compared with that in the first exemplary embodiment. It is thus possible to reduce the storage capacities of the correction tables 14R' and 14B' to approximately ⅓.

2.2 Operation of Color Nonuniformity Correction Circuit

The operation of the color nonuniformity correction circuit 302' of the second exemplary embodiment is specifically described.

When the power supply is switched on, concerning G, the reference correction data Drefg corresponding to 63 pairs of reference coordinates are read from the ROM 12'. At the same time, concerning R color and B color, the reference correction data Drefr and Drefb corresponding to 20 pairs of reference coordinates are read.

Next, the interpolation processor 13 interpolates the reference correction data Drefr, Drefg, and Drefb according to the level to generate the correction data DHr, DHg, and DHb. These correction data DHr, DHg, and DHb are transferred to the correction tables 14R', 14G, and 14B'. At the same time, an X counter 11 counts dot clock signals DCLKs, and a Y counter 10 counts horizontal clock signals HCLKs. It is assumed that X-coordinate data Dx and Y-coordinate data Dy, which are the count results, are such that Dx=64 and Dy=64. Specifically, the case of correcting image data DR', DG', and DB' corresponding to a dot with the coordinates (64,64) in FIG. 11 is assumed.

Four pieces of correction data DHr1 to DHr4 corresponding to R, which are used to perform interpolation according to the coordinates, are read from the correction table 14R' based on the X-coordinate data Dx, the Y-coordinate data Dy, and the level of the image data. Concerning G, four pieces of correction data are read from the correction table 14G. Similarly, regarding B, four pieces of correction data are read from the correction table 14B'.

Concerning G, the correction data corresponding to pairs of reference coordinates (1,1), (128,1), (1,128), and (128, 128) are read. Regarding R and B, the correction data corresponding to pairs of reference coordinates (1,1), (256, 1), (1,256), and (256,256) are read, respectively.

Subsequently, arithmetic units 15R, 15G, and 15B interpolate the four pieces of correction data, respectively, based on the X-coordinate data Dx and the Y-coordinate data Dy. The interpolation processing is performed using linear interpolation. Therefore, the accuracy is determined in accordance with the distance between the coordinates of the image data to be displayed and the correction data used to perform interpolation processing. The shorter the distance, the more the accuracy is improved. Concerning the accuracy in correction data Dh generated by interpolation, G is corrected more accurately than R and B. Since human visual characteristics are such that sensitivity to G is greater than to R and B, it is possible to improve the display quality when synthesizing an image from images in the primary colors RGB by relatively increasing the interpolation accuracy for G.

In the second exemplary embodiment, the amounts of the reference correction data Drefr, Drefg, and Drefb are set differently in accordance with human visual characteristics. Alternatively, the reference correction data Drefr, Drefg, and Drefb for all pairs of reference coordinates can be prepared, and the number of bits for each piece of data can be set in accordance with the visual characteristics, such that 10 bits are set for Drefg and 5 bits are set for Drefr.

3. Third Exemplary Embodiment

According to the first and second exemplary embodiments, the interpolation processor 13 computes the correction data DHr, DHg, and DHb corresponding to each level ranging from the white reference level (voltage level V1) to the black reference level (voltage level V3), and these correction data DHr, DHg, and DHb are stored in the correction tables 14R, 14G, and 14B, respectively. This is because it is assumed that changes in transmissivity are small in regions below voltage level V1 and above voltage level V3 even when levels (gray scales) of image data differ greatly from each other. It is assumed that interpolation is generally performed in a satisfactory manner by using the reference correction data Drefr corresponding to voltage level V1 or V3.

In fact, when performing display at a luminance level that corresponds to a level below voltage level V1 by uniformly using the reference correction data Dref, which corresponds to voltage level V1, as correction data for image data below voltage level V1, interpolation may not be performed in a satisfactory manner since the correction data Dref does not truly correspond to the image data. A similar situation may arise when performing display at a luminance level above voltage level V3.

According to a third exemplary embodiment, appropriate correction data can be computed even in regions below voltage level V1 and above voltage level V3. It is thus possible to suppress nonuniformity of color at luminance levels corresponding to regions below voltage level V1 and above voltage level V3.

When correction data corresponding to a voltage level below voltage level V1 is computed, it is assumed that the contents of the correction data do not differ greatly from those of the reference correction data Dref corresponding to voltage level V1. In the third exemplary embodiment, concerning correction data within the range from voltage level V0, which corresponds to a minimum voltage level available for image data, to voltage level V1, which corresponds to the white reference level, the reference correction data Dref corresponding to voltage level V1 is multiplied by a coefficient gradually increasing from "1" in accordance with the difference between that voltage level and voltage level V1, and the product is used as the correction data corresponding to that voltage level. Similarly, when correction data corresponding to a voltage level above voltage level V3 is computed, it is assumed that the contents of the correction data do not differ greatly from those of the reference correction data Dref corresponding to voltage level V3. Concerning correction data within the range from voltage level V3, which corresponds to the black reference level, to voltage level V4, which corresponds to a maximum voltage level available for image data, the reference correction data Dref corresponding to voltage level V3 is multiplied by a coefficient gradually increasing from "1" in accordance with the difference between that voltage level and voltage level V3, and the product is used as the correction data corresponding to that voltage level.

According to the first and second exemplary embodiments, when the input image data DR' (DG' or DB') is below voltage level V1, the address generator 17R (17G or 17B) generates, for the correction table 14R(14G or 14B), a column address designating the first column and reads the correction data at four adjacent pairs of reference coordinates, which correspond to voltage level V1. When the input image data DR' (DG' or DB') exceeds voltage level V3, the address generator 17R (17G or 17B) generates a column address designating an n-th column and reads correction data at four adjacent pairs of reference coordinates, which correspond to voltage level V3. According to the third exemplary embodiment, the point at which the correction data corresponding to voltage level V1 or V3 is multiplied by a coefficient lies between the correction table 14R and an arithmetic unit 15R in FIG. 3.

3.1 Structure of Color Nonuniformity Correction Circuit

A color nonuniformity correction circuit 302 of the third exemplary embodiment is described. FIG. 14 is a block diagram of basic portions of the color nonuniformity correction circuit 302 of the third exemplary embodiment, which are to be added between the correction table 14R and the arithmetic unit 15R in FIG. 3.

In the drawing, when the level (gray scale) of image data DR' is below voltage level V1 (white reference level), a W-LUT (look up table) 322 and a coefficient interpolating unit 324 output a coefficient kw corresponding to that level.

Specifically, as shown in FIG. 15, the W-LUT 322 stores coefficient data kwmax, kw1, kw2, and kwmin lying on a characteristic curve gradually increasing from "1" as the level decreases from the white reference level V1. The coefficient data kwmax, kw1, kw2, and kwmin correspond to four voltage levels V0, Vw1, Vw2, and V1, respectively. At the same time, when the image data DR' at a level above the minimum voltage level V0 and below voltage level V1 (white reference level) is input, the W-LUT 322 outputs two pieces of coefficient data at levels higher and lower than that level. For example, when the level of the image data DR' is above voltage level Vw1 and below voltage level Vw2, the W-LUT 322 outputs two pieces of coefficient data, i.e., the coefficient data kw1 corresponding to voltage level Vw1 and the coefficient data kw2 corresponding to voltage level Vw2. The coefficient interpolating unit 324 interpolates the two pieces of coefficient data output from the W-LUT 322, and supplies the coefficient data kw corresponding to the level of the image data DR', which is below voltage level V1, to one input end of each of multipliers 331 to 334.

Similarly, when the level (gray scale) of the image data DR' exceeds voltage level V3 (black reference level), a B-LUT 342 and a coefficient interpolating unit 344 output a coefficient kb corresponding to that level. Specifically, as shown in FIG. 16, the B-LUT 342 stores coefficient data kbmin, kb1, kb2, and kbmax lying on a characteristic curve gradually increasing from "1" as the level increases from the black reference level V3. The coefficient data kbmin, kb1, kb2, and kbmax correspond to four voltage levels V3, Vb1, Vb2, and V4, respectively. At the same time, when the image data DR' at a level above voltage level V3 (black reference level) and below the maximum voltage level V4 is input, two pieces of coefficient data at levels higher and lower than that level are output. For example, when the level is above voltage level Vb2 and below voltage level V4, the B-LUT 342 outputs two pieces of coefficient data, i.e., the coefficient data kb2 corresponding to voltage level Vb2 and the coefficient data kbmax corresponding to voltage level V4. The coefficient interpolating unit 344 interpolates the two pieces of coefficient data output from the B-LUT 342, and supplies the coefficient data kb corresponding to the level of the image data DR', which exceeds voltage level V3, to one input end of each of multipliers 351 to 354. In the third exemplary embodiment, the coefficient characteristics of the W-LUT 322 and the B-LUT 324 are set taking into consideration the display characteristics shown in FIG. 5.

In the third exemplary embodiment, among the four pieces of correction data read from the correction table 14R, correction data DHr1 is divided and sent to three paths described below, and the separated correction data DHr1 are output. Specifically, the correction data DHr1 is supplied to the other input end of the multiplier 331 as a first path. The correction data DHr1 is supplied to an input end b of a selector 370 as a second path. The correction data DHr1 is supplied to the other input end of the multiplier 351 as a third path. Similarly, concerning the remaining three pieces of correction data DHr2, DHr3, and DHr4, the correction data DHr2, DHr3, and DHr4 are input to the other input end of each of the multipliers 332, 333, and 334, respectively, as a first path. The correction data DHr2, DHr3, and DHr4 are input to the input ends b of the respective selectors 370 as a second path. The correction data DHr2, DHr3, and DHr4 are input to the other input end of each of the multipliers 352, 353, and 354, respectively, as a third path. The products obtained by the multipliers 331 to 334 are input to input ends a of the respective selectors 370, and the products obtained by the multipliers 351 to 354 are input to input ends c of the respective selectors 370.

Subsequently, the four selectors 370 select and output one of the input ends a, b, and c in accordance with a control signal sel. A data determining unit 360 determines the level (gray scale) of the input image data DR' and outputs the following control signals sel to the four selectors 370. Specifically, when the image data DR' is below voltage level V1, the data determining unit 360 outputs a control signal sel that causes the selectors 370 to select the input ends a. When the image data DR' is above voltage level 1 and below voltage level V3, the data determining unit 360 outputs a control signal sel that causes the selectors 370 to select the input ends b. When the image data DR' exceeds voltage level V3, the data determining unit 360 outputs a control signal sel that causes the selectors 370 to select the input ends c. An arithmetic unit 15R obtains correction data Dh that will correspond to the coordinates (coordinates corresponding to the image data DR') specified by X-coordinate data Dx and Y-coordinate data Dy by performing interpolation processing based on the correction data selected and output by the four selectors 370. This is similar to the first and second exemplary embodiments.

The structure for computing the correction data Dh corresponding to the image data DR' for R is described. Similar structures can be used for image data DG' for G and image data DB' for B.

3.2 Operation of Color Nonuniformity Correction Circuit

The operation of a color nonuniformity correction circuit 302 of the third exemplary embodiment is specifically described. The operation up to the reading of four pieces of correction data DHr1 to DHr4, which are used to perform interpolation processing according to the coordinates, from a correction table 14R based on the X-coordinate data Dx, the Y-coordinate data Dy, and the data value of the image data DR' (step S5 in FIG. 9) is the same as that in the first exemplary embodiment. The operation from the point at which the correction data Dh, which will correspond to the coordinates specified by the X-coordinate data Dx and the Y-coordinate data Dy, is interpolated by the arithmetic unit 15R based on the four pieces of correction data onward is the same as that in the first exemplary embodiment.

The following description mainly illustrates the operation in which four pieces of correction data DHr1 to DHr4 read from the correction table 14R are interpolated and are supplied to the arithmetic unit 15R. The description is divided into the following cases.

3.2.1 When Level of Image Data is Below V1

The operation when the level of the input image data DR' is below voltage level V1 corresponding to the white reference level is described. In this case, the W-LUT 322 outputs two pieces of coefficient data at levels higher and lower than the level of the image data DR'. The coefficient interpolating unit 324 interpolates the two pieces of coefficient data and outputs coefficient data kw corresponding to the level of the image data DR'.

At the same time, when the level of the input image data DR' is below voltage level V1, four pieces of correction data DHr1 to DHr4, which are output from the correction table 14R, correspond to four pairs of the reference coordinates surrounding the coordinates specified by the X-coordinate data Dx and the Y-coordinate data Dy. The four pairs of reference coordinates correspond to the white reference level.

Therefore, the products computed by the multipliers 331 to 334 can be obtained by appropriately expanding the correction data corresponding to the four pairs of reference coordinates, each pair corresponding to voltage level V1, in accordance with the difference between the level of the input image data DR' and voltage level V1, which is the white reference level. At the four selectors 370, each input end a is selected by the data determining unit 360. By interpolating the four products computed by the multipliers 331 to 334 according to the coordinates, the arithmetic unit 15R obtains the correction data Dh for the image data DR'.

The operation for computing the correction data Dh corresponding to the image data DR' for R is described. Similar description applies to the operation for computing correction data Dh for the image data DG' for G and for the image data DB' for B.

3.2.2 When Level of Image Data is Above V1 and Below V3

The operation when the level of the input image data DR' is above voltage level V1, which corresponds to the white reference level, and below voltage level V3, which corresponds to the black reference level, is described.

In this case, as described above, four pieces of correction data DHr1 to DHr4, which are output from the correction table 14R, correspond to four pairs of the reference coordinates surrounding the coordinates specified by the X-coordinate data Dx and the Y-coordinate data Dy. The four pairs of reference coordinates correspond to the level of the image data. At the same time, at the four selectors 370, each input end b is selected by the data determining unit 360. By interpolating the four pieces of correction data DHr1 to DHr4 read from the correction table 14 according to the coordinates, the arithmetic unit 15R obtains the correction data Dh for the image data DR'.

In other words, this computing operation is the same as that in the first exemplary embodiment. As in the first exemplary embodiment, nonuniformity of color can be removed by the operation when the level of the input image data DR' is above voltage level V1, which corresponds to the white reference level, and below voltage level V3, which corresponds to the black reference level.

3.2.3 When Level of Image Data Exceeds V3

The operation when the level of the input image data DR' exceeds voltage level V3, which corresponds to the black reference level, is described. In this case, the B-LUT 342 outputs two pieces of coefficient data at levels higher and lower than the level of the image data DR'. The coefficient interpolating unit 344 interpolates the two pieces of coefficient data and outputs coefficient data kb corresponding to the level of the image data DR'.

At the same time, when the level of the input image data DR' exceeds voltage level V3, as described above, four pieces of correction data DHr1 to DHr4, which are output from the correction table 14R, correspond to four pairs of the reference coordinates surrounding the coordinates specified by the X-coordinate data Dx and the Y-coordinate data Dy. The four pairs of reference coordinates correspond to the black reference level.

The products computed by the multipliers 331 to 334 are obtained by appropriately expanding the correction data corresponding to the four pairs of reference coordinates, each pair corresponding to voltage level V3 or the black reference level, in accordance with the difference between the level of the input image data DR' and voltage level V3. At the four selectors 370, each input end c is selected by the data determining unit 360. By interpolating the four products computed by the multipliers 351 and 354 according to the coordinates, the arithmetic unit 15R obtains the correction data Dh for the image data DR'.

The operation for computing the correction data Dh corresponding to the image data DR' for R is described. Similar description applies to the computing of correction data Dh for the image data DG' for G and for the image data DB' for B.

According to the third exemplary embodiment, when the level of the input image data DR' is below voltage V1, correction data corresponding to the white reference level is multiplied by a coefficient corresponding to the level of the input image data. When the level of the input image data DR' exceeds voltage V3, correction data corresponding to the black reference level is multiplied by a coefficient corresponding to the level of the input image data. Accordingly, the correction data corresponding to the level of the input image data is obtained. Furthermore, the correction data Dh is obtained by performing interpolation processing according to the coordinates. Therefore, it is possible to appropriately remove nonuniformity of color at luminance levels corresponding to regions below voltage level V1 and above voltage level V3.

According to the third exemplary embodiment, the case of using the color nonuniformity correction circuit 302 (see FIG. 3) of the first exemplary embodiment is described. Also, it is possible to use the color nonuniformity correction circuit 302' (see FIG. 10) of the second exemplary embodiment.

According to the third exemplary embodiment, the W-LUT 322 is provided in correspondence to a region below voltage level V1, and the B-LUT 342 is provided in correspondence to a region above voltage level V3. In both cases, as the voltage level becomes farther away from the white reference level V1 or the black reference level V3, the coefficient kw or kb gradually increases from "1". Therefore, it is possible to use a common look up table. Also, it is possible to use a look up table in only one of regions below voltage level V1 and above voltage level V3 to compute correction data.

According to the third exemplary embodiment, the W-LUT 322 and the B-LUT 324 are configured to store four pieces of coefficient data at different voltage levels. In order to improve the accuracy, it is possible to store five or more pieces of coefficient data. In order to reduce the storage capacity, it is possible to store three or two pieces of coefficient data.

4. Electronic Apparatus

An example of using the above-described image processing circuit in an electronic apparatus other than a projector is described next.

4.1 Mobile Computer

An example of using the above-described image processing circuit in a display unit of a mobile computer is described. FIG. 17 is a perspective view of the structure of the computer. In the drawing, a computer 1700 includes a main unit 1704 provided with a keyboard 1702 and a liquid crystal display panel 100. A backlight unit (not shown) for improving the visibility is provided at the back of the liquid crystal display panel 100.

The above-described projector 1100 includes three types of panels, namely, the liquid crystal display panels 100R, 100G, and 100B, corresponding to the respective RGB colors. The display panel 100 displays the RGB colors using a single color filter. Image signals VIDr1 to VIDr6, VIDg1 to VIDg6, and VIDb1 to VIDb6 are not supplied in parallel to the liquid crystal display panel 100, but are supplied using time sharing. In this case, as in the color nonuniformity correction circuit 302, two-step interpolation processing is performed according to the level (gray scale) and the coordinates, thus substantially removing nonuniformity of luminance and color.

4.2 Cellular Phone

An example of using the above-described image processing circuit in a display unit of a cellular phone is described next. FIG. 18 is a perspective view of the structure of the cellular phone. In the drawing, a cellular phone 1800 includes a plurality of operating buttons 1802, an earpiece receiver 1804, a mouthpiece transmitter 1806, and the liquid crystal display panel 100 used as the display unit. The liquid crystal display panel 100 displays the RGB colors using a single color filter. Alternatively, the display unit may perform monochrome display. When the display unit is to perform monochrome display, the image processing circuit is only required to be configured to perform display in a single color instead of performing display in the three primary colors.

5. Others

In addition to the electronic apparatuses illustrated in FIGS. 17 and 18, other types include a liquid crystal television, a viewfinder videocassette recorder, a monitor-direct-view videocassette recorder, a car navigation apparatus, a pager, an electronic notebook, a calculator, a word processor, a workstation, a television phone, a POS terminal, an apparatus provided with a touch panel, and the like. Needless to say, the present invention is applicable to these electronic apparatuses.

According to the present invention, the active matrix liquid crystal display apparatus using the TFTs is described by way of example. The present invention is not limited to this. The present invention can be applied to an active matrix liquid crystal display apparatus using TFDs (Thin Film Diodes) as switching devices and to a passive matrix liquid crystal display apparatus which requires no switching device. Also, the present invention is not limited to the transmissive type, and the present invention is applicable to a reflective type. In addition, the present invention is not limited to the liquid crystal display apparatus. The present invention can be applied to a display apparatus for performing display using electro-optical changes in various electro-optical materials such as electro-luminescence devices.

As described above, according to the present invention, two-step interpolation processing is performed according to the level and to the coordinates, thus reducing nonuniformity of luminance and nonuniformity of color to a great extent while requiring a small memory capacity.

What is claimed is:

1. An image data correction method for correcting nonuniformity of luminance in an image display region which displays an image in accordance with input image data, comprising the steps of:

storing reference correction data, which correspond to a plurality of specific levels among levels available for the input image data, for each of a plurality of predetermined reference coordinates in the image display region;

interpolating the reference correction data according to level to generate first correction data which correspond to the levels available for the input image data, for each of the plurality of reference coordinates, and storing the first correction data in correspondence to the reference coordinates and the levels;

selecting, from the stored first correction data, data which correspond to a plurality of reference coordinates surrounding the coordinates of the input image data in the image display region and which correspond to the level of the input image data;

interpolating the selected first correction data according to the coordinates to generate second correction data which correspond to the input image data; and adding the second correction data to the input image data.

2. An image processing circuit for correcting nonuniformity of luminance in an image display region which displays an image in accordance with input image data, comprising:

first storage means for storing reference correction data which correspond to a plurality of specific levels among levels available for the input image data, for each of a plurality of predetermined reference coordinates in the image display region;

first interpolation means for interpolating the reference correction data according to level to generate first correction data which correspond to the levels available for the input image, for each of the plurality of reference coordinates;

second storage means for storing the first correction data in correspondence to the reference coordinates and the levels;

selecting means for selecting, from the first correction data stored in the second storage means, data which correspond to a plurality of reference coordinates surrounding the coordinates of the input image data in the image display region and which correspond to the level of the input image data;

second interpolation means for interpolating the first correction data selected by the selecting means according to the coordinates to generate second correction data which correspond to the input image data; and adding means for adding the second correction data to the input image data.

3. An image processing circuit for correcting nonuniformity of luminance in an image display region which displays an image in accordance with input image data, comprising:

a memory that stores reference correction data which correspond to a plurality of specific levels among levels available for the input image data, for each of a plurality of predetermined reference coordinates in the image display region;

an interpolation processor that interpolates the reference correction data according to the level to generate first correction data which correspond to the levels available for the input image data, for each of the plurality of reference coordinates;

a correction table that stores the first correction data in correspondence to the reference coordinates and the levels;

a selection circuit that selects, from the first correction data stored in the correction table, data which correspond to a plurality of reference coordinates surrounding the coordinates of the input image data in the image display region and which correspond to the level of the input image data;

an arithmetic unit that interpolates the first correction data selected by the selection circuit according to the coordinates to generate second correction data which correspond to the input image data; and an adder that adds the second correction data to the input image data.

4. The image processing circuit according to claim 3, wherein:

a plurality of scanning lines extending in the X-direction, a plurality of data lines extending in the Y-direction, and pixels corresponding to intersections of the data lines and the scanning lines are provided in the image display region;

the selection circuit includes:

an X counter that counts a first clock signal used as a time basis for X-direction scanning in the image display region and generating X-coordinate data indicating the X-coordinate of a pixel that corresponds to the input image data in the image display region;

a Y counter that counts a second clock signal used as a time basis for Y-direction scanning in the image display region and generating Y-coordinate data indicating the Y-coordinate of the pixel that corresponds to the input image data in the image display region; and an address generator that specifies a plurality of reference coordinates surrounding the coordinates of the input image data based on the X-coordinate data and the Y-coordinate data and generating addresses used to read pieces of corresponding correction data from the correction table based on the plurality of specified reference coordinates and the level of the input image data; and the arithmetic unit performs interpolation processing in accordance with the distance from the coordinates of the input image data which are specified by the X-coordinate data and the Y-coordinate data, to the pieces of correction data read by the address generator.

5. The image processing circuit according to claim 4, wherein:

the input image data includes data corresponding to each of the RGB colors; the reference correction data includes data corresponding to each of the RGB colors;

the memory, the interpolation processor, the X counter, and the Y counter are shared among the RGB colors; and the correction table, the arithmetic unit, the address generator, and the adder are provided for each of the RGB colors.

6. The image processing circuit according to claim 3, wherein:

a plurality of scanning lines extending in the X-direction, a plurality of data lines extending in the Y-direction, and pixels formed of electrodes with a liquid crystal therebetween in correspondence to intersections of the data lines and the scanning lines are provided in the image display region; and the reference correction data corresponding to the plurality of specific levels include correction data corresponding to first and second levels respectively corresponding to first and second turning points at which a display characteristic curve indicating the transmissivity or reflectivity suddenly changes relative to the effective value of a voltage applied to the liquid crystal, and to at least one level between the first and second levels.

7. The image processing circuit according to claim 6, wherein:

the interpolation processor interpolates the reference correction data when generating the first correction data corresponding to each level ranging from the first level to the second level;

the interpolation processor uses the reference correction data that corresponds to the first level when generating the first correction data corresponding to each level below the first level;

the interpolation processor uses the reference correction data that corresponds to the second level when generating the first correction data corresponding to each level exceeding the second level;

the correction table stores correction data for each level ranging from the first level to the second level;

the selection circuit selects, from the correction data stored in the correction table, the correction data that corresponds to the first level when the level of the input image data is below the first level;

the selection circuit selects, from the correction data stored in the correction table, the correction data that corresponds to the level of the input image data when the level of the input image data is within the range of the first level to the second level; and the selection circuit selects, from the correction data stored in the correction table, the correction data that corresponds to the second level when the level of the input image data exceeds the second level.

8. The image processing circuit according to claim 7, wherein:

when the level of the input image data is below the first level or exceeds the second level, the image processing circuit further includes:

a coefficient output unit that outputs a coefficient in accordance with the difference between the level of the input image data and one of the first level and the second level; and a multiplier that multiplies the coefficient output from the coefficient output unit by the correction data corresponding to the first or the second level, which is selected by the selection circuit; and the arithmetic unit uses the product obtained by the multiplier as the first correction data selected by the selection circuit.

9. The image processing circuit according to claim 8, wherein:

the coefficient output unit includes:

a look up table that stores coefficients corresponding to at least two points in a region in which the level of the input image data is below the first level or in a region in which the level of the input image data exceeds the second level; and a coefficient interpolating unit that interpolates the coefficients stored in the look up table and obtaining a coefficient that corresponds to the input image data.

10. The image processing circuit according to claim 3, wherein:

the input image data includes data corresponding to each of the RGB colors;

the reference correction data includes data corresponding to each of the RGB colors;

the interpolation processor generates the first correction data in correspondence to each of the RGB colors; and the correction table, the arithmetic unit, and the adder are provided for each of the RGB colors.

11. The image processing circuit according to claim 10, wherein:

the amount of the reference correction data for G is greater than the amount of the reference correction data for R or for B.

12. The image processing circuit according to claim 11, wherein:

the reference correction data for R or for B correspond to coordinates extracted from the plurality of reference coordinates corresponding to the reference correction data for G based on specific rules.

13. An electro-optical apparatus, comprising:

an image processing circuit as set forth in claim 3; and a drive circuit that displays an image in an image display region based on the image data corrected by the image processing circuit.

14. An electronic apparatus, comprising:

an electro-optical apparatus as set forth in claim 13.

* * * * *